US012800832B2

(12) United States Patent
Sato

(10) Patent No.: US 12,800,832 B2
(45) Date of Patent: Nov. 17, 2026

(54) FUSION SPLICER, AND METHOD FOR CONNECTING OPTICAL FIBER

(71) Applicant: Sumitomo Electric Optifrontier Co., Ltd., Kanagawa (JP)

(72) Inventor: Ryuichiro Sato, Kanagawa (JP)

(73) Assignee: Sumitomo Electric Optifrontier Co., Ltd., Kanagawa (JP)

( * ) Notice: Subject to any disclaimer, the term of this patent is extended or adjusted under 35 U.S.C. 154(b) by 289 days.

(21) Appl. No.: 18/559,913

(22) PCT Filed: Jun. 15, 2022

(86) PCT No.: PCT/JP2022/023874
§ 371 (c)(1),
(2) Date: Nov. 9, 2023

(87) PCT Pub. No.: WO2022/265029
PCT Pub. Date: Dec. 22, 2022

(65) Prior Publication Data

US 2024/0280753 A1 Aug. 22, 2024

(30) Foreign Application Priority Data

Jun. 18, 2021 (JP) ................................ 2021-101985

(51) Int. Cl.
*G02B 6/255* (2006.01)

(52) U.S. Cl.
CPC ......... *G02B 6/2555* (2013.01); *G02B 6/2553* (2013.01)

(58) Field of Classification Search
CPC .. G02B 6/2556; G02B 6/2555; G02B 6/2553; G02B 6/3652
See application file for complete search history.

(56) References Cited

U.S. PATENT DOCUMENTS 6,939,060 B2 * 9/2005 Tamura ................ G02B 6/2552 359/341.1
9,568,682 B1 2/2017 Barwicz et al.
(Continued)

FOREIGN PATENT DOCUMENTS

CN 1247990 3/2000
CN 203643642 U 6/2014
(Continued)

*Primary Examiner* — John Bedtelyon
(74) *Attorney, Agent, or Firm* — IPUSA, PLLC

(57) ABSTRACT

A fusion splicer (1) for fusion-splicing a plurality of optical fibers (3L), arranged side by side along a direction intersecting a longitudinal direction, with respective other optical fibers (3R) includes a base member (11L) with a groove portion (17L) having a plurality of V-grooves formed therein for setting the plurality of optical fibers (3L), and a pair of guide walls (12FL, 12BL) configured to guide setting of the plurality of optical fibers (3L) into the plurality of V-grooves, wherein the pair of guide walls (12FL, 12BL) are disposed at an interval in a width direction of the groove portion (17L), one (12FL) of the guide walls constituting the pair has a guide surface (GF1) capable of coming into contact with one of the plurality of optical fibers (3L), another one (12BL) of the guide walls constituting the pair has a guide surface (GF2) capable of coming into contact with another one of the plurality of optical fibers (3L), and each guide surface (GF1, GF2) includes a portion inclined toward the groove portion (17L) when viewed along a direction of extension of the plurality of V-grooves.

8 Claims, 14 Drawing Sheets

(56) References Cited

U.S. PATENT DOCUMENTS

| | | | | |
|---|---|---|---|---|
| 2003/0007755 | A1 | 1/2003 | Morita et al. | |
| 2003/0128931 | A1 | 7/2003 | Kim et al. | |
| 2020/0166710 | A1* | 5/2020 | Gilles | G02B 6/3803 |
| 2022/0026638 | A1 | 1/2022 | Akiyama et al. | |

FOREIGN PATENT DOCUMENTS

| | | |
|---|---|---|
| EP | 0985943 | 3/2000 |
| JP | H05-164934 | 6/1993 |
| JP | H09-127359 | 5/1997 |
| JP | 2003-021744 | 1/2003 |
| JP | 2003-207678 | 7/2003 |
| KR | 10-2014-0125001 | 10/2014 |
| WO | 2020/162044 | 8/2020 |

* cited by examiner

FUSION SPLICER, AND METHOD FOR CONNECTING OPTICAL FIBER

FIELD OF THE INVENTION

The present disclosure relates to fusion splicers and methods of splicing optical fibers.

The present application is based on and claims priority to Japanese application No. 2021-101985 filed on Jun. 18, 2021, and the entire contents of this Japanese application are incorporated herein by reference.

BACKGROUND ART

A fusion splicer as conventionally known in the art fusion-splices a plurality of optical fibers arranged side by side along a width direction intersecting the longitudinal direction (see Patent Document 1). The fusion splicer includes a fiber placement table that has a groove portion having a plurality of V-grooves formed therein in which a plurality of optical fibers are placed.

The coating material at the distal end of the optical fibers is removed at the time of fusion-splicing. A portion of an optical fiber where the coating material is removed to expose glass fiber is referred to as a bare fiber portion, and a portion coated with the coating material is referred to as an optical fiber element or an optical fiber cable. The bare fiber portions, not coated with the coating material, of a plurality of optical fibers easily spread in the width direction.

PRIOR ART DOCUMENT

Patent Document

Patent Document 1: Japanese Laid-open Patent Publication No. 2003-21744

SUMMARY OF THE INVENTION

Means for Solving the Problem

A fusion splicer according to an embodiment of the present disclosure is a fusion splicer for fusion-splicing a plurality of optical fibers, arranged side by side along a direction intersecting a longitudinal direction, with respective other optical fibers, including a base member with a groove portion having a plurality of V-grooves formed therein for setting the plurality of optical fibers, and a pair of guide walls configured to guide setting of the plurality of optical fibers into the plurality of V-grooves, wherein the pair of guide walls are disposed at an interval in a width direction of the groove portion, one of the guide walls constituting the pair has a guide surface capable of coming into contact with one of the plurality of optical fibers, another one of the guide walls constituting the pair has a guide surface capable of coming into contact with another one of the plurality of optical fibers, and each guide surface includes a portion inclined toward the groove portion when viewed along a direction of extension of the plurality of V-grooves.

DETAILED DESCRIPTION OF THE INVENTION

Figure 1:
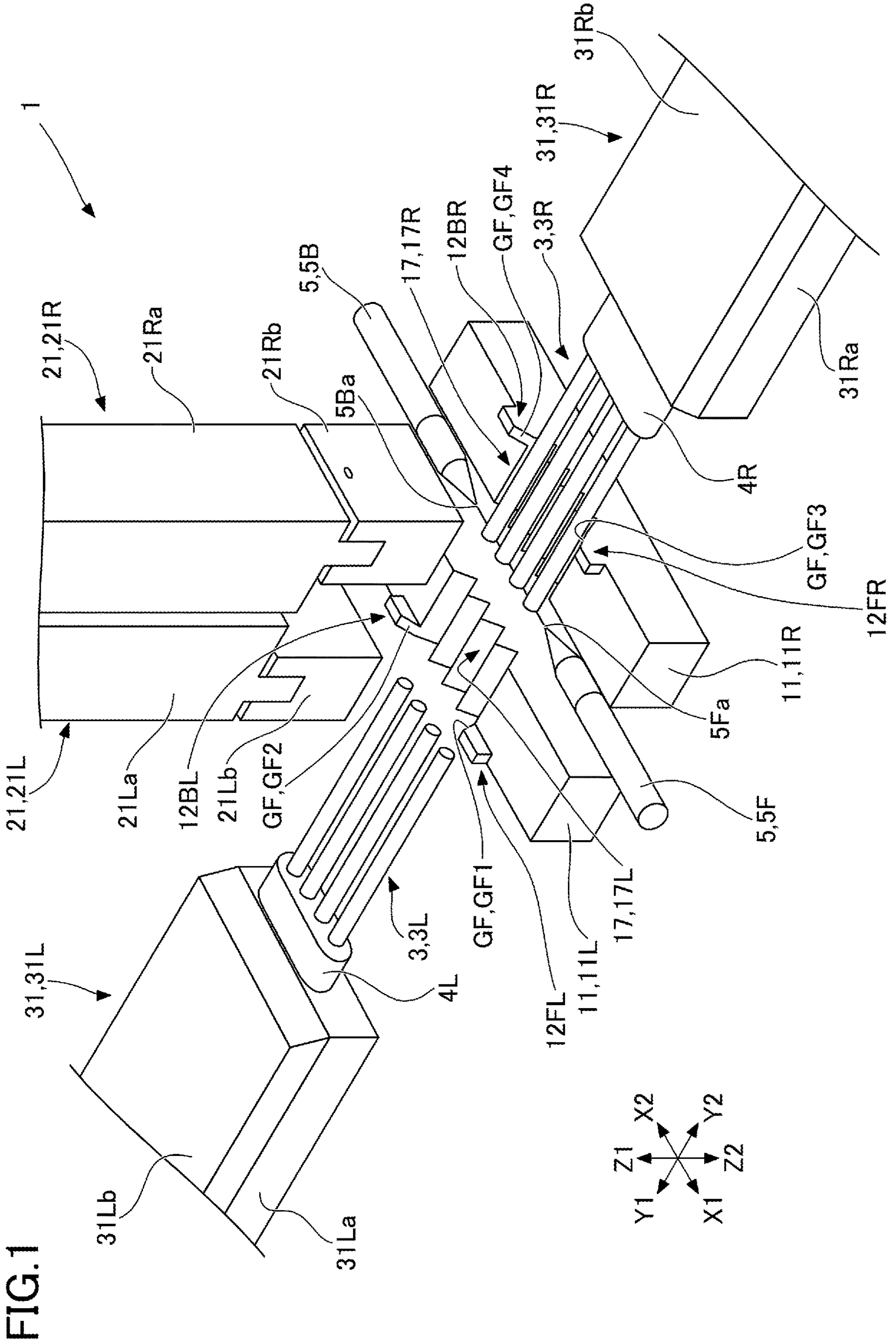
FIG. 1 is an axonometric view of part of a fusion splicer and optical fibers to be spliced.

Problems to be Solved by the Present Disclosure

The groove portion of a fiber placement table is configured such that a plurality of V-grooves for setting the bare fiber portions of a plurality of optical fibers, i.e., glass fibers, are arranged parallel to each other. Because of this, the orientation of the glass fibers positioned at the outermost positions, among the plurality of glass fibers spread in the width direction, may deviate from the orientation of the corresponding V-grooves. Some of the bare fiber portions of the plurality of optical fibers spread in the width direction may fail to be fit in the corresponding V-grooves, and may slide out of the corresponding V-grooves.

Accordingly, it is desirable to prevent the bare fiber portions of optical fibers from sliding out of the V-grooves.

Effects of the Present Disclosure

According to the present disclosure, it is possible to prevent the bare fiber portions of optical fibers from sliding out of the V-grooves.

Description of Embodiments of the Present Disclosure

Embodiments of the present disclosure will first be listed and described. In the following description, the same or corresponding elements are referred to by the same reference numerals, and a duplicate description thereof will not be provided.

(1) A fusion splicer according to an aspect of the present disclosure is a fusion splicer for fusion-splicing a plurality of optical fibers, arranged side by side along a direction intersecting direction, with respective other a longitudinal optical fibers, which includes a base member with a groove portion having a plurality of V-grooves formed therein for setting the plurality of optical fibers, and a pair of guide walls configured to guide setting of the plurality of optical fibers into the plurality of V-grooves, wherein the pair of guide walls are disposed at an interval in a width direction of the groove portion, one of the guide walls constituting the pair has a guide surface capable of coming into contact with one of the plurality of optical fibers, another one of the guide walls constituting the pair has a guide surface capable of coming into contact with another one of the plurality of optical fibers, and each guide surface includes a portion inclined toward the groove portion when viewed along a direction of extension of the plurality of V-grooves. This configuration has the pair of guide walls, and can thus narrow the spread of the bare fiber portions in the width direction when the bare fiber portions of the plurality of optical fibers are set in the plurality of V-grooves. This is because the bare fiber portions spread outward in the width direction come into contact with the guide surfaces of the guide walls when approaching the V-grooves, thereby to be pushed back inward in the width direction. Consequently, this configuration brings about the result that the bare fiber portions are prevented from sliding out of the V-grooves when the bare fiber portions of the plurality of optical fibers are set in the plurality of V-grooves.

(2) Each guide surfaces may be disposed as a continuous extension of a groove surface of one of the plurality of V-grooves when viewed along the direction of extension of the plurality of V-grooves. The fact that the guide surface and the groove surface are continuous with each other means that, for example, the inclination angle of the guide surface and the inclination angle of the groove surface are equal to each other where the guide surface and the groove surface meet when viewed along the direction of extension of the V-grooves. It may be noted that the guide surface and the groove surface do not need to be physically connected. This is because the guide surface and the groove surface may be spaced apart from each other in the direction of extension of the V-grooves. The inclination angle of the guide surface is the angle formed between the guide surface and an imaginary vertical plane, and the inclination angle of the groove surface is the angle formed between the groove surface and an imaginary vertical plane. The fact that the inclination angle of the guide surface and the inclination angle of the groove surface are equal to each other may include a situation in which an angular difference between the inclination angle of the guide surface and the inclination angle of the groove surface is less than or equal to a predetermined minute angle. This configuration brings about the result that, for example, the bare fiber portions readily enter the V-grooves upon moving along the guide surfaces while being pushed back by the guide surfaces.

(3) The pair of guide walls may be formed as a member separate from the base member. This configuration yields the advantage that the guide walls can be newly added to an existing fusion splicer without removing or replacing an existing base member in the existing fusion splicer. This configuration also allows the guide walls and the base member to be made of different materials. This configuration thus brings about the advantage that the manufacturing cost of the fusion splicer can be reduced as compared with, for example, the case in which the guide walls and the base member are integrally formed of the same material and the material of the base member is expensive.

(4) The pair of guide walls may be integrated with the base member. This configuration brings about the advantage that the positioning accuracy of the guide walls with respect to the V-grooves can be improved as compared with the case in which the guide walls are formed as a member separate from the base member, for example.

(5) At least one of the guide walls constituting the pair may be configured to be movable relative to the groove portion in the width direction. This configuration brings about the advantage that, for example, the guide walls can cope with optical fibers having various numbers of cores. For example, this configuration achieves the advantage that the guide walls configured to correct the widthwise spread of bare fiber portions of a 24-core ribbon cable can be used to correct the widthwise spread of a ribbon cable having a smaller number of cores (for example, a 16-core ribbon cable, an 8-core ribbon cable, or the like).

(6) An optical fiber splicing method according to an aspect of the present disclosure fusion-spices a plurality of optical fibers with respective other optical fibers by using a fusion-splicer that includes a base member with a groove portion having a plurality of V-grooves formed therein for setting a plurality of optical fibers, and a pair of guide walls configured to guide setting of the plurality of optical fibers into the plurality of V-grooves, the optical fiber splicing method including placing the plurality of optical fibers in the plurality of V-grooves while bringing one of the plurality of optical fibers into contact with a guide surface of one of the guide walls constituting the pair, the guide walls being disposed at an interval in a width direction of the groove portion, and fusion-splicing the plurality of optical fibers with respective other optical fibers. By including the step of placing the plurality of optical fibers in the plurality of V-grooves while bringing one of the plurality of optical fibers into contact with a guide surface of one of the guide walls constituting the pair, this method can narrow the spread of bare fiber portions in the width direction when the bare fiber portions of the plurality of optical fibers are set in the plurality of V-grooves. This is because the bare fiber portions spread outward in the width direction come into contact with the guide surfaces of the guide walls when approaching the V-grooves, thereby to be pushed back inward in the width direction. Consequently, this configuration brings about the result that the bare fiber portions are prevented from sliding out of the V-grooves when the bare fiber portions of the plurality of optical fibers are set in the plurality of V-grooves.

Details of Embodiments of the Present Disclosure

In the following, specific examples of a fusion splicer 1 and an optical fiber splicing method according to an embodiment of the present disclosure will be described with reference to the accompanying drawings.

FIG. 1 is an axonometric view illustrating part of the fusion splicer 1. In FIG. 1, X1 represents one direction along an X-axis of a three-dimensional orthogonal coordinate system, and X2 represents the opposite direction along the X-axis. Y1 represents one direction along a Y-axis of the three-dimensional orthogonal coordinate system, and Y2 represents the opposite direction along the Y-axis. Similarly, Z1 represents one direction along a Z-axis of the three-dimensional orthogonal coordinate system, and Z2 represents the opposite direction along the Z-axis. In the present embodiment, the X1 side of the fusion splicer 1 corresponds to the front side (front surface side) of the fusion splicer 1, and the X2 side of the fusion splicer 1 corresponds to the rear side (rear surface side) of the fusion splicer 1. The Y1 side of the fusion splicer 1 corresponds to the left-hand side of the fusion splicer 1, and the Y2 side of the fusion splicer 1 corresponds to the right-hand side of the fusion splicer 1. The Z1 side of the fusion splicer 1 corresponds to the upper side of the fusion splicer 1, and the Z2 side of the fusion splicer 1 corresponds to the lower side of the fusion splicer 1. The same applies to other drawings.

The fusion splicer 1 is a device configured to be able to fusion-splice, by arc discharge, a plurality of optical fiber pairs arranged with the end faces abutting against each other. In the illustrated example, the fusion splicer 1 is configured to be able to fusion-splice four optical fiber pairs. To be specific, the fusion splicer 1 includes a pair of electrode rods 5 (i.e., a rear electrode rod 5B and a front electrode rod 5F), a pair of base members 11 (i.e., a left base member 11L and a right base member 11R), a pair of clamps 21 (i.e., a left clamp 21L and a right clamp 21R), and a pair of fiber holders 31 (i.e., a left fiber holder 31L and a right fiber holder 31R).

The pair of electrode rods 5 includes the rear electrode rod 5B and the front electrode rod 5F spaced apart from each other in the X-axis direction. The pair of electrode rods 5 are arranged such that the distal end 5Ba of the rear electrode rod 5B and the distal end 5Fa of the front electrode rod 5F oppose each other. In the illustrated example, the rear electrode rod 5B includes a generally conical portion whose diameter decreases toward the distal end 5Ba. The same applies to the front electrode rod 5F.

The plurality of optical fiber pairs arranged on the pair of base members 11 are glass fibers, and are arranged between the rear electrode rod 5B and the front electrode rod 5F for generating arc discharge. The portions of the plurality of optical fiber pairs disposed on the pair of base members 11 are bare fiber portions in which the coating material is removed to expose the glass.

To be specific, the plurality of pairs of bare fiber portions include bare fiber portions of a left optical fiber group 3L belonging to a left ribbon cable 4L and bare fiber portions of a right optical fiber group 3R belonging to a right ribbon cable 4R. Hereinafter, the left optical fiber group 3L and the right optical fiber group 3R may be referred to as an optical fiber group 3 for the sake of convenience of description.

The ribbon cable is formed by arranging a plurality of optical fibers (optical fiber elements) in parallel and coating the optical fibers collectively with, for example, an ultraviolet curable resin (i.e., coating material). Both the left ribbon cable 4L and the right ribbon cable 4R in the illustrated example are a four-core ribbon cable in which four optical fibers (i.e., optical fiber elements) are arranged in parallel and collectively coated with an ultraviolet curable rein (i.e., coating material).

The pair of base members 11 is a member for supporting the plurality of optical fiber pairs, and includes a left base member 11L and a right base member 11R between which the pair of electrode rods 5 is interposed. In other words, the pair of electrode rods 5 is disposed between the left base member 11L and the right base member 11R that are spaced apart from each other in the Y-axis direction. The right base member 11R of the illustrated example has a right V-groove group 17R, which is also referred to as a right optical fiber placement portion or a right groove portion. The left base member 11L has a left V-groove group 17L, which is also referred to as a left optical fiber placement portion or a left groove portion. Hereinafter, the left V-groove group 17L and the right V-groove group 17R may be referred to as a V-groove group 17 for the sake of convenience of description.

The left V-groove group 17L has a plurality of V-grooves for arranging a plurality of optical fibers (i.e., the left optical fiber group 3L), and the right V-groove group 17R has a plurality of V-grooves for arranging a plurality of optical fibers (i.e., the right optical fiber group 3R). In the illustrated example, the left V-groove group 17L has four V-grooves for arranging four optical fibers. The four V-grooves are arrayed at equal intervals in the X-axis direction and are formed to linearly extend along the Y-axis direction. Similarly, the right V-groove group 17R has four V-grooves for arranging four optical fibers. The four V-grooves are arrayed at equal intervals in the X-axis direction, and are formed to linearly extend along the Y-axis direction.

The plurality of V-grooves in the right V-groove group 17R and the plurality of V-grooves in the left V-groove group 17L are configured such that positioning of the plurality of optical fiber pairs is performed simultaneously. In the illustrated example, the four V-grooves in the right V-groove group 17R and the four V-grooves in the left V-groove group 17L are arranged in an opposing relationship in the direction of extension (i.e., the Y-axis direction), and are configured such that positioning of the four optical fiber pairs is performed simultaneously.

With this arrangement, four optical fibers positioned by the four V-grooves in the right V-groove group 17R and four optical fibers positioned by the four V-grooves in the left V-groove group 17L are caused to abut against each other in the region between the right base member 11R (or the right V-groove group 17R) and the left base member 11L (or the left V-groove group 17L).

Figure 2A:
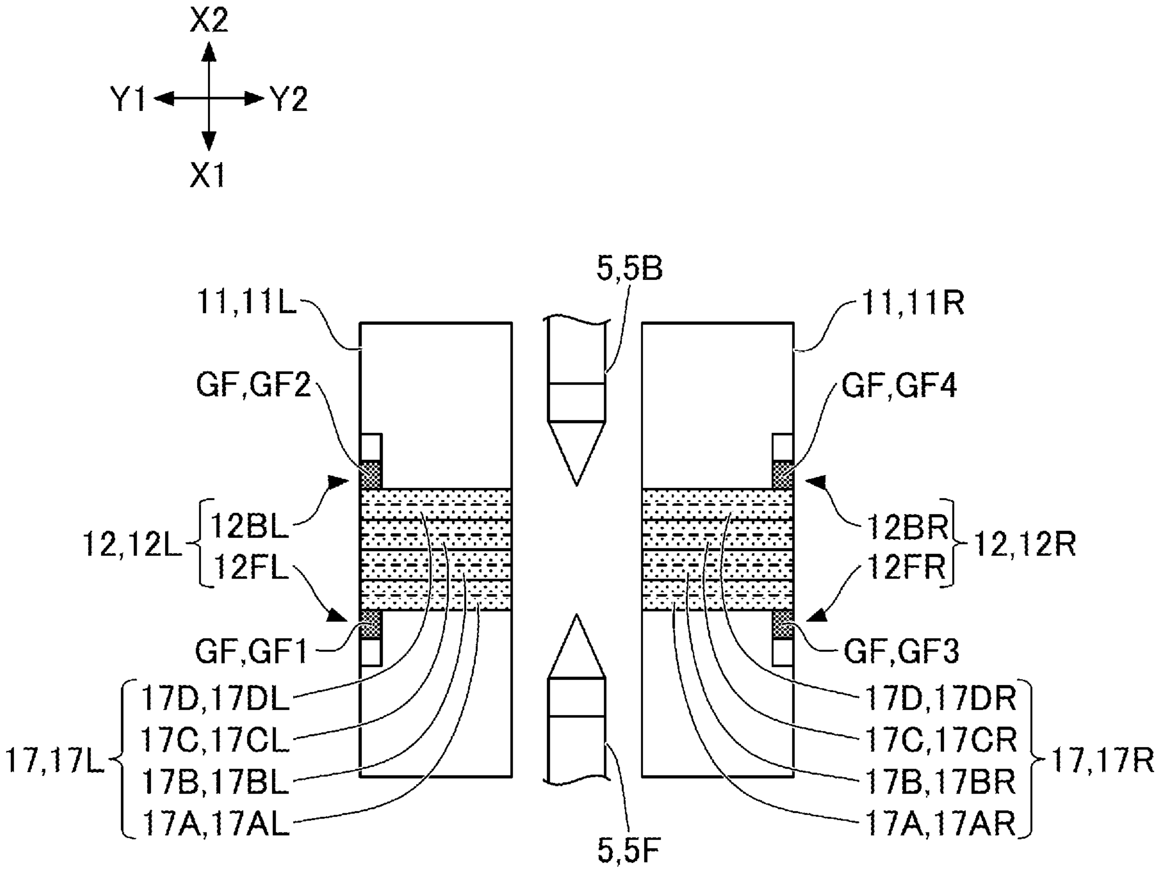
FIG. 2A is a top view of part of the fusion splicer.
Figure 2B:
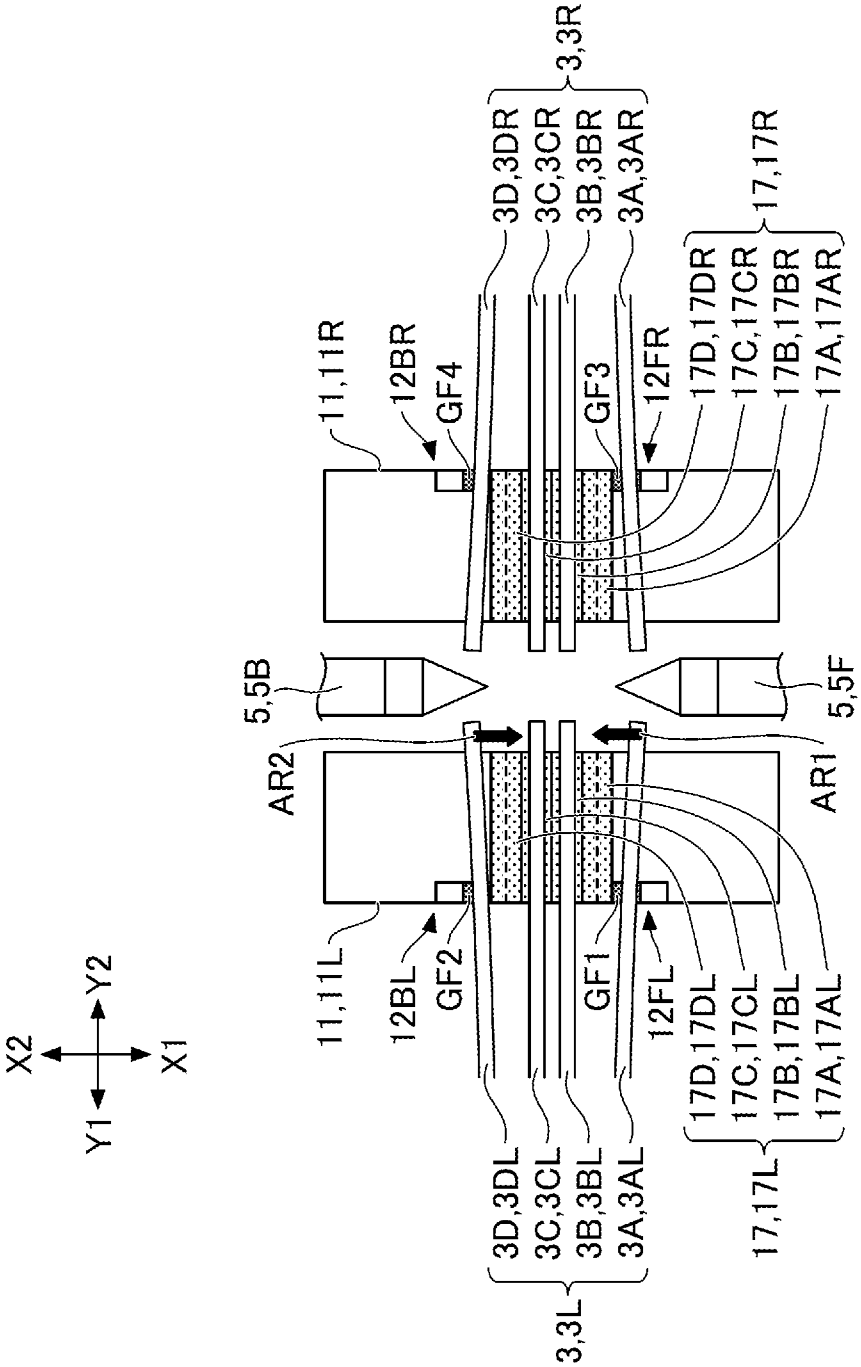
FIG. 2B is a top view of part of the fusion splicer and the optical fibers to be spliced in a setting step.
Figure 2C:
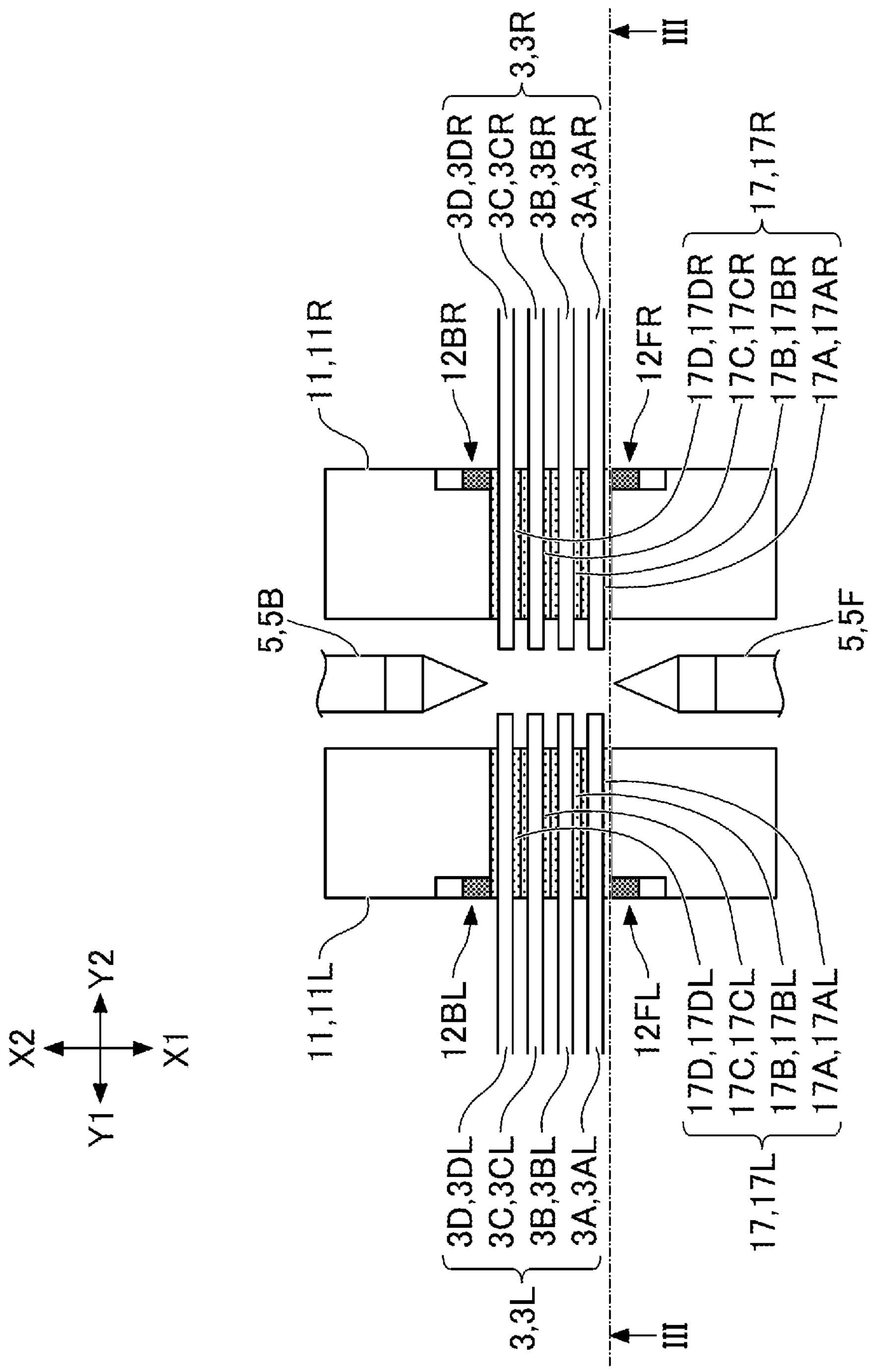
FIG. 2C is a top view of part of the fusion splicer and the optical fibers to be spliced.

In the following, details of the V-groove group 17 in which the four optical fiber pairs are positioned will be described with reference to FIG. 2A through FIG. 2C. FIG. 2A through FIG. 2C are top views illustrating part of the fusion splicer 1. Specifically, FIG. 2A through FIG. 2C are top views of the electrode rods 5, the base members 11, and guide walls 12. To be more specific, FIG. 2A illustrates the situation before the optical fiber group 3 is placed above the V-groove group 17. FIG. 2B illustrates the situation when the optical fiber group 3 is placed above the V-groove group 17 (i.e., the situation before the optical fiber group 3 is set in the V-groove group 17). FIG. 2C illustrates the situation after the optical fiber group 3 is set in the V-groove group 17. It may be noted that in FIG. 2A through FIG. 2C, a coarse dot pattern is applied to the groove surfaces of the V-groove group 17, and a fine dot pattern is applied to guide surfaces GF (which will be described later) of the guide walls 12, for the sake of increased clarity. The bottom of each V-groove is indicated by a dashed line.

As illustrated in FIG. 2A, the left V-groove group 17L includes a first left V-groove 17AL, a second left V-groove 17BL, a third left V-groove 17CL, and a fourth left V-groove 17DL, and the right V-groove group 17R includes a first right V-groove 17AR, a second right V-groove 17BR, a third right V-groove 17CR, and a fourth right V-groove 17DR. The first left V-groove 17AL and the first right V-groove 17AR constitute a first V-groove pair 17A. The second left V-groove 17BL and the second right V-groove 17BR constitute a second V-groove pair 17B. The third left V-groove 17CL and the third right V-groove 17CR constitute a third V-groove pair 17C. The fourth left V-groove 17DL and the fourth right V-groove 17DR constitute a fourth V-groove pair 17D.

Further, as illustrated in FIG. 2B, the left optical fiber group 3L includes a first left optical fiber 3AL, a second left optical fiber 3BL, a third left optical fiber 3CL, and a fourth left optical fiber 3DL as bare fiber portions, and the right optical fiber group 3R includes a first right optical fiber 3AR, a second right optical fiber 3BR, a third right optical fiber 3CR, and a fourth right optical fiber 3DR as bare fiber portions. The first left optical fiber 3AL and the first right optical fiber 3AR constitute a first optical fiber pair 3A. The second left optical fiber 3BL and the second right optical fiber 3BR constitute a second optical fiber pair 3B. The third left optical fiber 3CL and the third right optical fiber 3CR constitute a third optical fiber pair 3C. The fourth left optical fiber 3DL and the fourth right optical fiber 3DR constitute a fourth optical fiber pair 3D.

The guide walls 12 are configured to guide the setting of the optical fiber group 3 into the V-groove group 17. In the illustrated example, the guide walls 12 include left guide walls 12L and right guide walls 12R, as illustrated in FIG. 2A. The left guide walls 12L include a left rear guide wall 12BL and a left front guide wall 12FL, and the right guide walls 12R include a right rear guide wall 12BR and a right front guide wall 12FR.

To be specific, the guide walls 12 include the left guide walls 12L that guide the setting of the left optical fiber group 3L into the left V-groove group 17L, and include the right guide walls 12R that guide the setting of the right optical fiber group 3R into the right V-groove group 17R.

The left guide walls 12L include the left rear guide wall 12BL and the left front guide wall 12FL formed at positions corresponding to the left end of the left V-groove group 17L situated toward the left fiber holder 31L. Similarly, the right guide walls 12R include the right rear guide wall 12BR and the right front guide wall 12FR formed at positions corresponding to the right end of the right V-groove group 17R situated toward the right fiber holder 31R.

The guide walls 12 have guide surfaces GF. In FIG. 2A through FIG. 2C, a fine dot pattern is applied to the guide surfaces GF for the sake of increased clarity. To be more specific, as illustrated in FIG. 2B, the left front guide wall 12FL has a first guide surface GF1 that comes into contact with the first left optical fiber 3AL located furthest to the front (toward the X1 side) in the left optical fiber group 3L, and the left rear guide wall 12BL has a second guide surface GF2 that comes into contact with the fourth left optical fiber 3DL located furthest to the rear (toward the X2 side) in the left optical fiber group 3L. Similarly, the right front guide wall 12FR has a third guide surface GF3 that comes into contact with the first right optical fiber 3AR located furthest to the front (toward the X1 side) in the right optical fiber group 3R, and the right rear guide wall 12BR has a fourth guide surface GF4 that comes into contact with the fourth right optical fiber 3DR located furthest to the rear (toward the X2 side) in the right optical fiber group 3R.

In the illustrated example, the first guide surface GF1 of the left front guide wall 12FL is formed as a continuous extension of the first left V-groove 17AL located furthest to the front in the left V-groove group 17L, and the second guide surface GF2 of the left rear guide wall 12BL is formed as a continuous extension of the fourth left V-groove 17DL located furthest to the rear in the left V-groove group 17L. Similarly, the third guide surface GF3 of the right front guide wall 12FR is formed as a continuous extension of the first right V-groove 17AR located furthest to the front in the right V-groove group 17R, and the fourth guide surface GF4 of the right rear guide wall 12BR is formed as a continuous extension of the fourth right V-groove 17DR located furthest to the rear in the right V-groove group 17R.

In the following, an operation of setting the optical fiber group 3 in the V-groove group 17 will be described. Although the following description is directed to the operation of setting the left optical fiber group 3L in the left V-groove group 17L, it is similarly applied to the operation of setting the right optical fiber group 3R in the right V-groove group 17R.

In order to set the left optical fiber group 3L in the left V-groove group 17L, the operator places the left optical fiber group 3L spread in the width direction of the left ribbon cable 4L (i.e., X-axis direction) directly above the left V-groove group 17L as illustrated in FIG. 2B. Thereafter, the operator moves the left optical fiber group 3L downward (toward the direction of the left V-groove group 17L).

As the left optical fiber group 3L is moved downward (toward the direction of the left V-groove group 17L), the first left optical fiber 3AL located furthest to the front (i.e., toward the X1 side) in the left optical fiber group 3L comes into contact with the first guide surface GF1 of the left front guide wall 12FL, and the fourth left optical fiber 3DL located furthest to the rear (i.e., toward the X2 side) in the left optical fiber group 3L comes into contact with the second guide surface GF2 of the left rear guide wall 12BL.

The first left optical fiber 3AL located furthest to the front among the four optical fibers constituting the left optical fiber group 3L is guided by the first guide surface GF1 of the left front guide wall 12FL inclined toward the first left V-groove 17AL, and is moved further rearward (in the X2 direction) as it moves further downward (in the Z2 direction), as indicated by the arrow AR1 in FIG. 2B. That is, the first guide surface GF1 of the left front guide wall 12FL enables the first left optical fiber 3AL spread in the width direction (i.e., forward (in the X1 direction)) to move backward (in the X2 direction) so that the first left optical fiber 3AL comes closer to the widthwise center of the left ribbon cable 4L as the first left optical fiber 3AL moves further downward (in the Z2 direction). In other words, the first guide surface GF1 serves to make the first left optical fiber 3AL curved in the width direction (i.e., forward (in the X1 direction)) straight again such that the longitudinal direction (i.e., axial direction) of the first left optical fiber 3AL coincides with the direction of extension of the first left V-groove 17AL.

Although the second left optical fiber 3BL extends straight along the second left V-groove 17BL in the example illustrated in FIG. 2B, it may alternatively be spread in the width direction (i.e., forward (in the X1 direction)), that is, may be curved in the width direction (i.e., forward (in the X1 direction)) in the same manner as the first left optical fiber 3AL.

In such a case, the second left optical fiber 3BL is moved rearward by being pushed by the first left optical fiber 3AL that is moved rearward by the left front guide wall 12FL. As a result, the second left optical fiber 3BL extends straight along the second left V-groove 17BL.

Similarly, the fourth left optical fiber 3DL located furthest to the rear among the four optical fibers constituting the left optical fiber group 3L is guided by the second guide surface GF2 of the left rear guide wall 12BL inclined toward the fourth left V-groove 17DL, and is moved further forward (in the X1 direction) as it moves further downward (in the Z2 direction) as indicated by the arrow AR2 in FIG. 2B. That is, the second guide surface GF2 of the left rear guide wall 12BL enables the fourth left optical fiber 3DL spread in the width direction (i.e., rearward (in the X2 direction) to move forward (in the X1 direction) so that the fourth left optical fiber 3DL comes closer to the widthwise center of the left ribbon cable 4L as the fourth left optical fiber 3DL moves further downward (in the Z2 direction). In other words, the second guide surface GF2 serves to make the fourth left optical fiber 3DL curved in the width direction (i.e., backward (in the X2 direction)) straight again such that the longitudinal direction (i.e., axial direction) of the fourth left optical fiber 3DL coincides with the direction of extension of the fourth left V-groove 17DL.

Although the third left optical fiber 3CL extends straight along the third left V-groove 17CL in the example illustrated in FIG. 2B, it may alternatively be spread in the width direction (i.e., rearward (in the X2 direction)), that is, may be curved in the width direction (i.e., rearward (in the X2 direction)), similarly to the fourth left optical fiber 3DL.

In such a case, the third left optical fiber 3CL is moved forward by being pushed by the fourth left optical fiber 3DL that is moved forward by the left rear guide wall 12BL. As a result, the third left optical fiber 3CL extends straight along the third left V-groove 17CL.

Thereafter, as the left optical fiber group 3L is moved downward to such an extent as to come into contact with the left V-groove group 17L as illustrated in FIG. 2C, the spread in the width direction is narrowed by the left rear guide wall 12BL and the left front guide wall 12FL. That is, the spread of the left optical fiber group 3L in the width direction is narrowed such that the respective axial lines of the first left optical fiber 3AL through the fourth left optical fiber 3DL become parallel to each other. As a result, the first left optical fiber 3AL is set in the first left V-groove 17AL while the longitudinal direction thereof is parallel to the direction of extension of the first left V-groove 17AL. The same applies to the second left optical fiber 3BL through the fourth left optical fiber 3DL.

Figure 3:
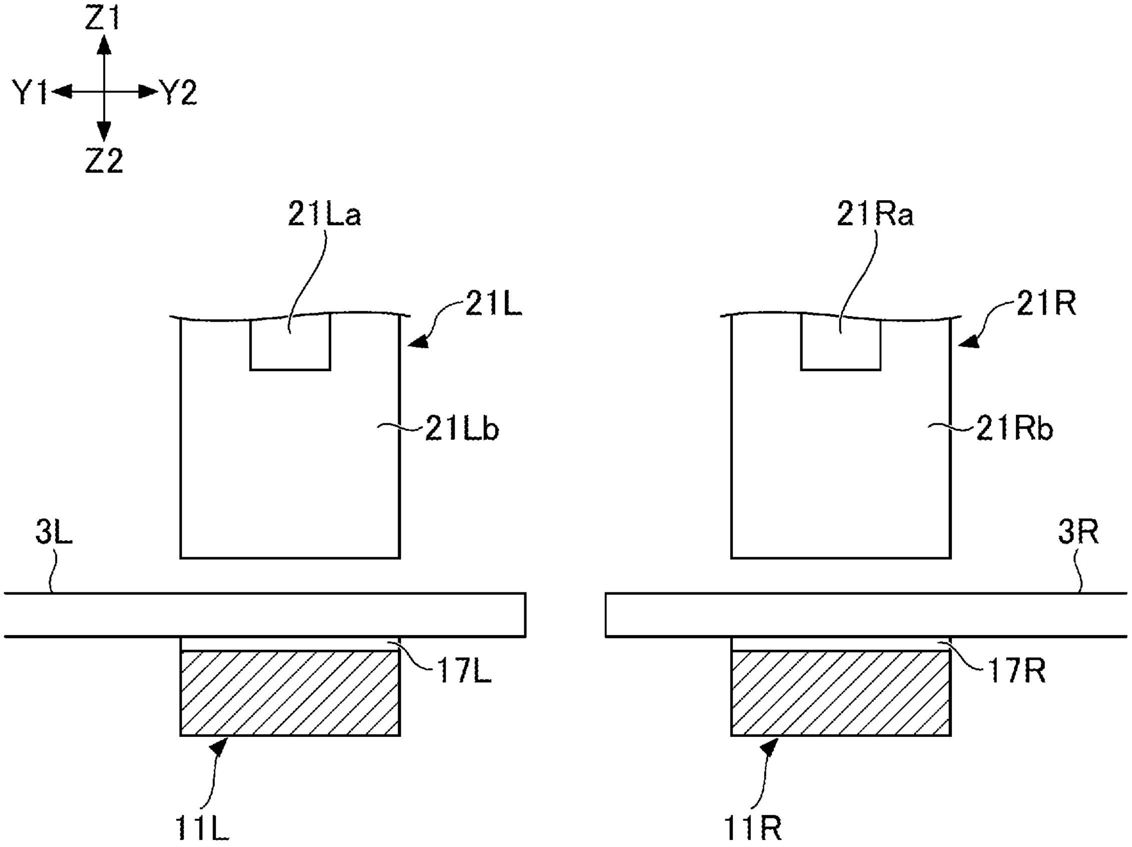
FIG. 3 is a cross-sectional view of part of the fusion splicer and the optical fibers to be spliced.

In the following, movements of the pair of clamps 21 (i.e., the left clamp 21L and the right clamp 21R) will be described with reference to FIG. 3. FIG. 3 is a cross-sectional view illustrating part of the fusion splicer 1. To be more specific, FIG. 3 is a cross-sectional view taken along the line III-III in FIG. 2C as viewed from the X1 direction as indicated by arrows. The cross section in FIG. 2C includes a cross section of the base member 11.

The left clamp 21L is configured to press the left optical fiber group 3L set in the left V-groove group 17L relatively against the left V-groove group 17L. Similarly, the right clamp 21R is configured to press the right optical fiber group 3R installed in the right V-groove group 17R relatively against the right V-groove group 17R. In the illustrated example, the left clamp 21L includes a left arm portion 21La and a left pressing portion 21Lb, and the right clamp 21R includes a right arm portion 21Ra and a right pressing portion 21Rb. The left arm portion 21La is disposed above the left V-groove group 17L, and the right arm portion 21Ra is disposed above the right V-groove group 17R. Further, the left arm portion 21La and the right arm portion 21Ra are configured to be movable in the vertical direction. The left arm portion 21La and the right arm portion 21Ra may have, for example, a substantially rectangular parallelepiped exterior shape as illustrated in FIG. 1. The left pressing portion 21Lb may be attached to the lower end of the left arm portion 21La, and the right pressing portion 21Rb may be attached to the lower end of the right arm portion 21Ra. In the illustrated example, the left pressing portion 21Lb is movable in the vertical direction (i.e., Z direction) at the lower end of the left arm portion 21La, and the right pressing portion 21Rb is movable in the vertical direction (i.e., Z direction) at the lower end of the right arm portion 21Ra. Although in the state illustrated in FIG. 3 the left pressing portion 21Lb is situated apart from the left optical fiber group 3L set in the left V-groove group 17L, the left pressing portion 21Lb may come into contact with the left optical fiber group 3L and press the left optical fiber group 3L toward the left V-groove group 17L by downward movement of the left arm portion 21La. The same applies to the right pressing portion 21Rb.

In the illustrated example, further, the left clamp 21L may be configured to have adjustable clamp pressure. The clamp force is a force that the left optical fiber group 3L set in the left V-groove group 17L receives from the left pressing portion 21Lb of the left clamp 21L. An elastic body such as a spring that urges the left pressing portion 21Lb downward may be disposed between the left arm portion 21La and the left pressing portion 21Lb. In this case, the left clamp 21L is capable of controlling clamp pressure by controlling the position of the left arm portion 21La in the vertical direction. The same applies to the right clamp 21R.

As illustrated in FIG. 1, the left fiber holder 31L is configured to hold the left optical fiber group 3L, and the right fiber holder 31R is configured to hold the right optical fiber group 3R. To be specific, the left holder 31L is configured to hold the left ribbon cable 4L including the left optical fiber group 3L, and the right fiber holder 31R is configured to hold the right ribbon cable 4R including the right optical fiber group 3R. To be more specific, the left fiber holder 31L includes a left fiber holder body 31La having a recess (not shown) for housing the left ribbon cable 4L, and includes a left lid 31Lb attached to the left fiber holder body 31La. Similarly, the right fiber holder 31R includes a right fiber holder body 31Ra having a recess (not shown) for housing the right ribbon cable 4R, and includes a right lid 31Rb attached to the right fiber holder body 31Ra.

By closing the left lid 31Lb while the left ribbon cable 4L is housed in the left fiber holder body 31La, the left ribbon cable 4L is secured in the left fiber holder 31L. The left fiber holder 31L is movable in a direction along the axial direction of the secured left optical fiber group 3L. That is, the left fiber holder 31L is movable along the direction of extension of the left V-groove group 17L (i.e., the Y-axis direction). When the left fiber holder 31L holding the left optical fiber group 3L moves, the secured left optical fiber group 3L is allowed to move along the left V-groove group 17L.

Similarly, by closing the right lid 31Rb while the right ribbon cable 4R is housed in the right fiber holder body 31Ra, the right ribbon cable 4R is secured in the right fiber holder 31R. The right fiber holder 31R is movable in a direction along the axial direction of the secured right optical fiber group 3R. That is, the right fiber holder 31R is movable along the direction of extension of the right V-groove group 17R (Y-axis direction). When the right fiber holder 31R holding the right optical fiber group 3R moves, the secured right optical fiber group 3R is allowed to move along the right V-groove group 17R.

Figure 4:
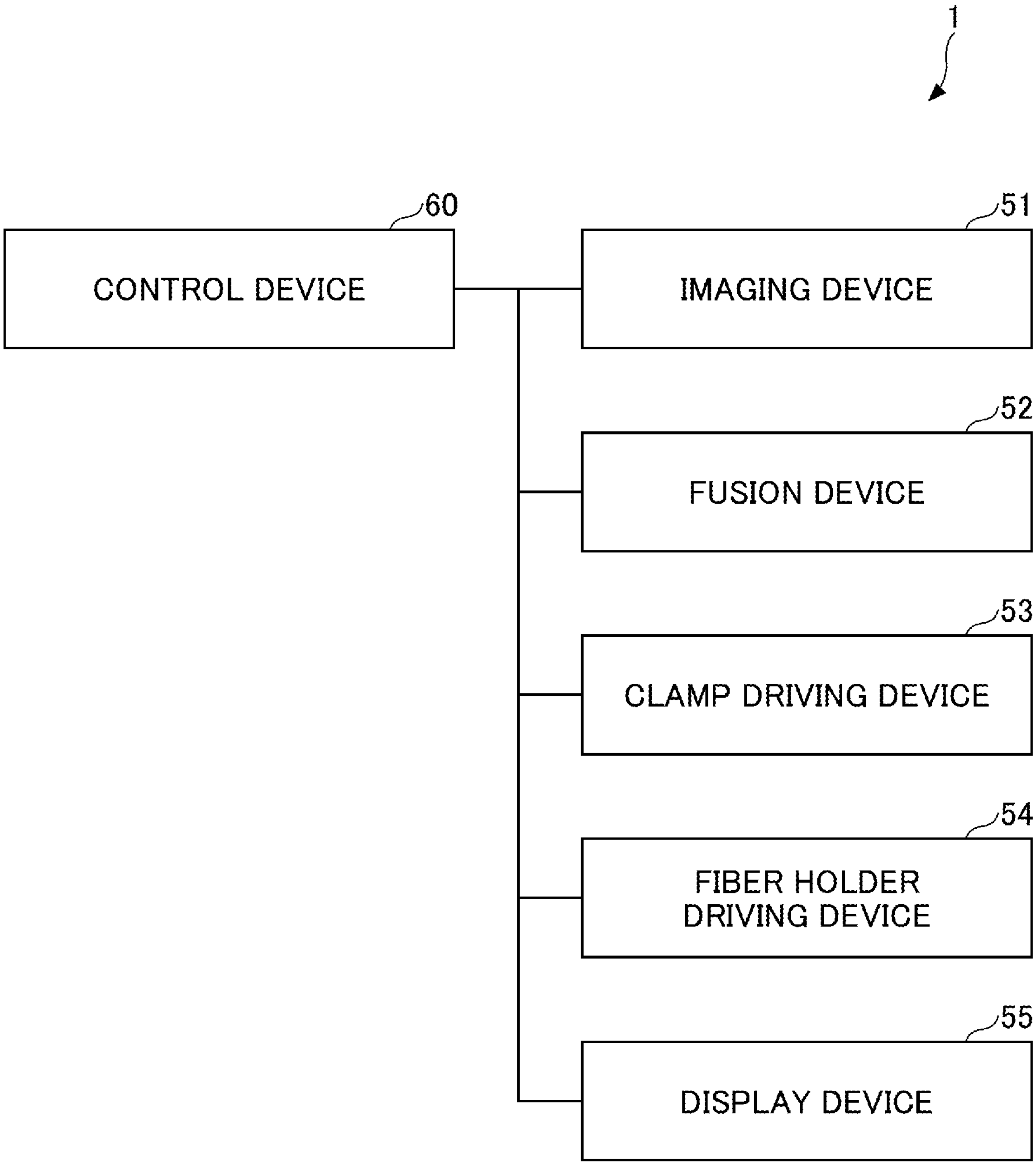
FIG. 4 is a block diagram illustrating a control system for controlling the fusion splicer.

In the following, a control system for controlling the fusion splicer 1 will be described with reference to FIG. 4. FIG. 4 is a block diagram illustrating the control system for controlling the fusion splicer 1.

As illustrated in FIG. 4, the fusion splicer 1 includes an imaging device 51, a fusion device 52, a clamp driving device 53, a fiber holder driving device 54, a display device 55, and a control device 60. In the present embodiment, the imaging device 51, the fusion device 52, the clamp driving device 53, the fiber holder driving device 54, and the display device 55 are controlled by the control device 60.

The control device 60 is, for example, a computer including a CPU (central processing unit), a RAM (random access memory), a ROM (read only memory), a communication module, an external storage device, and the like.

The imaging device 51 is configured to include, for example, a pair of cameras (an X camera and a Y camera). The X camera and the Y camera are each arranged to be able to simultaneously image the end of the left optical fiber group 3L set in the left V-groove group 17L and the end of the right optical fiber group 3R set in the right V-groove group 17R. Further, the viewing direction of the X camera and the viewing direction of the Y camera are orthogonal to each other. The control device 60 is capable of specifying the position of the optical fiber group 3 based on the images of the optical fiber group 3 captured from two different directions by the pair of cameras.

The fusion device 52 is one which fusion-splices the end of the left optical fiber group 3L and the end of the right optical fiber group 3R. In the present embodiment, the pair of electrode rods 5 belongs to the fusion device 52.

The clamp driving device 53 is one which presses the optical fiber group 3 relatively against the V-groove group 17. In the present embodiment, the clamp driving device 53 includes actuators that vertically move the left arm portion 21La belonging to the left clamp 21L and the right arm portion 21Ra belonging to the right clamp 21R.

The fiber holder driving device 54 is one which moves the optical fiber group 3 in a direction along the axial direction thereof (i.e., Y-axis direction). In the present embodiment, the fiber holder driving device 54 includes an actuator that moves the left fiber holder 31L in a direction along the axial direction (i.e., Y-axis direction) of the left optical fiber group 3L and an actuator that moves the right fiber holder 31R in a direction along the axial direction (i.e., Y-axis direction) of the right optical fiber group 3R.

The display device 55 is one which displays various kinds of information. In the present embodiment, the display device 55 is configured to display images captured by the imaging device 51. In the present embodiment, the display device 55 is a liquid crystal display.

The control device 60 is one which controls the imaging device 51, the fusion device 52, the clamp driving device 53, the fiber holder driving device 54, and the display device 55. In the present embodiment, the control device 60 acquires images captured by the imaging device 51 by controlling the imaging device 51. The control device 60 can cause, for example, the display device 55 to display the acquired image. In addition, the control device 60 may determine the state of one pair or a plurality of pairs of optical fibers by performing image processing on the acquired images. Further, the control device 60 may cause arc discharge to be generated between the rear electrode rod 5B and the front electrode rod 5F by controlling the fusion device 52. Moreover, the control device 60 may cause the left arm portion 21La of the left clamp 21L and the right arm portion 21Ra of the right clamp 21R to be moved in the vertical direction by controlling the clamp driving device 53. Under the control of the control device 60, the left clamp 21L may change the press state of the left optical fiber group 3L disposed in the left V-groove group 17L, and the right clamp 21R may change the press state of the right optical fiber group 3R disposed in the right V-groove group 17R. Further, the control device 60 may control the positions of the left fiber holder 31L and the right fiber holder 31R in the Y-axis direction by controlling the fiber holder driving device 54. To be more specific, the control device 60 may cause the left optical fiber group 3L held by the left fiber holder 31L to move in the right-left direction (i.e., Y-axis direction) by moving the left fiber holder 31L in the right-left direction (i.e., Y-axis direction), and may cause the right optical fiber group 3R held by the right fiber holder 31R to move in the right-left direction (i.e., Y-axis direction) by moving the right fiber holder 31R in the right-left direction (i.e., Y-axis direction).

Figure 5:
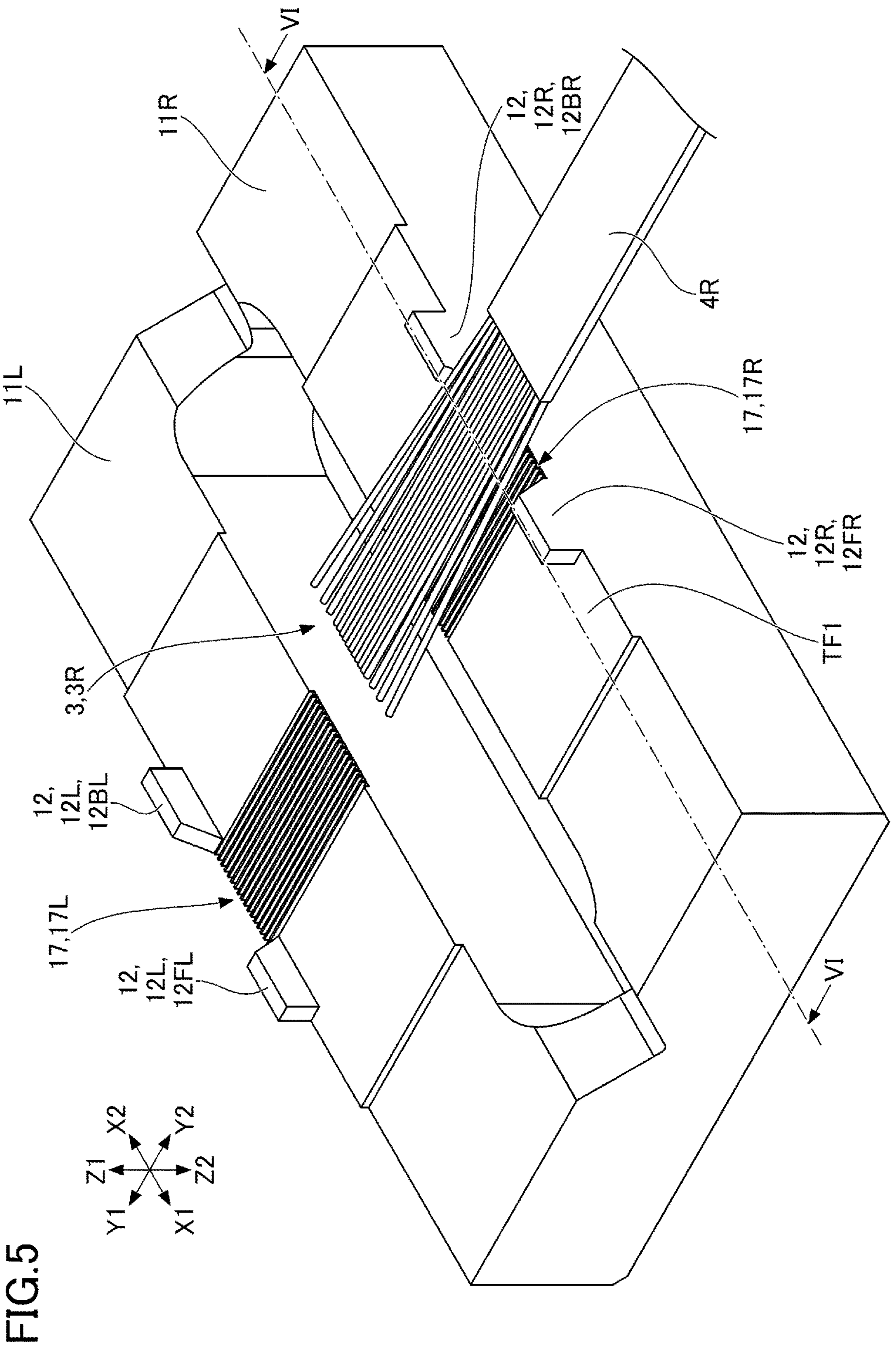
FIG. 5 is an axonometric view of optical fibers and a base member.
Figure 6:
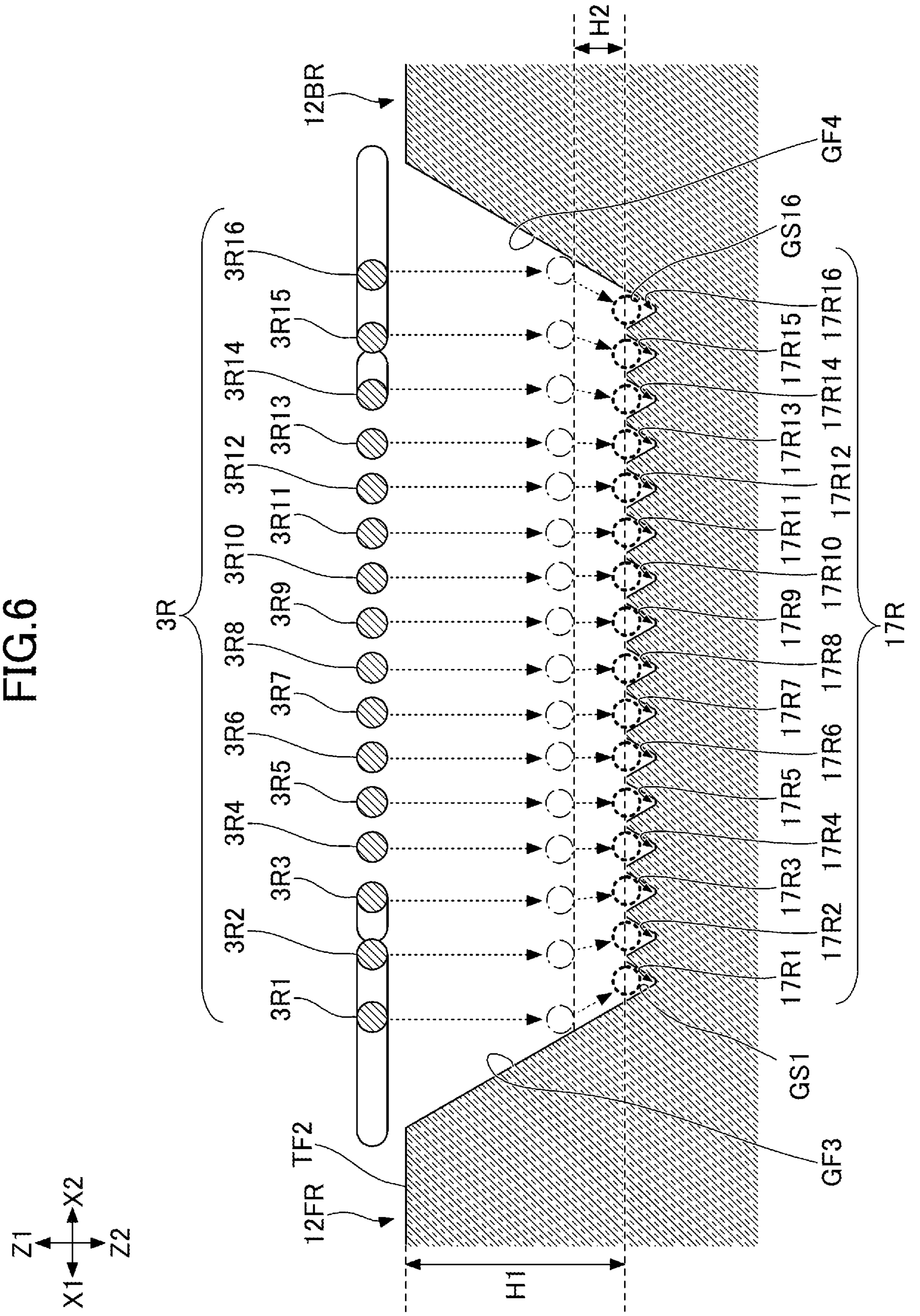
FIG. 6 is a cross-sectional view of the optical fibers and the base member.

In the following, the guide walls 12 will be described in detail with reference to FIG. 5 and FIG. 6. FIG. 5 is a top axonometric view of the base member 11 having the V-groove group 17 in which the optical fibers of a 16-core ribbon cable may be set. FIG. 6 is a cross-sectional view taken along the line VI-VI in FIG. 5 and viewed from the Y2 direction as indicated by arrows. The cross section in FIG. 5 includes a cross section of the right base member 11R having the 16 V-grooves (the first right V-groove 17R1 to the sixteenth right V-groove 17R16) formed therein and cross sections of the bare fiber portions of the 16 optical fibers (the first right optical fiber 3R1 to the sixteenth right optical fiber 3R16) belonging to the 16-core right ribbon cable 4R.

In recent years, not only a 16-core ribbon cable as illustrated in FIG. 5, but also a rollable ribbon cable (pliable ribbon cable) and an ultra-high-count ribbon cable having a larger number of optical fibers have been put into practical use. The characteristics of these ribbon cables include the fact that the bare fiber portions obtained by removing the coating material are more likely to be spread in the width direction (i.e., X-axis direction) than in a 4-core ribbon cable as illustrated in FIG. 1. One of the causes in the case of the ultra-high-count ribbon cable is arguably the fact that the removal of the coating material causes the coating edge to be crushed thereby to slightly widen the intervals between the adjacent optical fibers. Further, one of the causes in the case of a rollable ribbon cable made by loosely connecting two or four optical fibers (optical fiber elements) in pairs in a mesh form is arguably the fact that setting the rollable ribbon cable in the fiber holder is likely to cause the optical fibers to be oriented in various directions, which results in the optical fibers being likely to point to sideways where no obstruction exists.

Because of this, also in the example illustrated in FIG. 5 and FIG. 6, the bare fiber portions of the 16 optical fibers belonging to the 16-core ribbon cable are more likely to be spread in the width direction (i.e., X-axis direction) than the bare fiber portions of the 4 optical fibers belonging to the 4-core ribbon cable as illustrated in FIG. 1.

When the bare fiber portions spread in the width direction are set in the V-groove group 17 engraved in the flat surface as illustrated in FIG. 5 and FIG. 6, the orientations of the outermost cores of the ribbon cable would not be regulated in the configuration having no guide walls 12. Here, the "orientations of the outermost cores of the ribbon cable" refer to the orientations of the bare fiber portions of the outermost optical fibers in the width direction among the plurality of optical fibers belonging to the ribbon cable. In the example illustrated in FIG. 5 and FIG. 6, the orientations of the outermost cores of the right ribbon cable 4R refer to the orientation of the first right optical fiber 3R1 and the orientation of the sixteenth right optical fiber 3R16.

In the configuration including no guide walls 12, the deviation between the orientations of the V-groove group 17 structured to be straight and the orientations of the outermost cores of the ribbon cable would become large, which would result in the optical fiber group 3 failing to be fit in the V-groove group 17, and the optical fiber group 3 sliding out of the V-groove group 17. Such a situation leads to failure and redoing of fusion splicing. Redoing the fusion splicing requires redoing the cutting of a ribbon cable, the removing of a coating material, and the like, thereby needing extra time. The guide walls 12 serve to reduce the occurrence of such a situation.

It may be noted that the following description given with reference to FIG. 5 and FIG. 6 is directed to the right guide walls 12R that come in contact with the right optical fiber group 3R, but equally applies to the left guide walls 12L that come in contact with the left optical fiber group 3L.

The bare fiber portions of the 16 optical fibers (i.e., the first right optical fiber 3R1 to the sixteenth right optical fiber 3R16) belonging to the right ribbon cable 4R are spread in the width direction (i.e., X-axis direction) when disposed above the right V-groove group 17R as illustrated in FIG. 5 and FIG. 6, that is, before coming into contact with the right guide walls 12R.

It may be noted that FIG. 5 and FIG. 6 illustrate a situation in which the first right optical fiber 3R1 to the sixteenth right optical fiber 3R16 are disposed higher than the height H1 of the right guide walls 12R. The height H1 of the right guide walls 12R refers to the distance in the Z-axis direction between the upper surface TF1 of the right base member 11R (i.e., the right optical fiber arrangement portion) and the upper surface TF2 of the right guide walls 12R.

In FIG. 6, dotted arrows indicate the respective paths of movement of the right optical fiber group 3R moved downward from the position at the height H1. Further, in FIG. 6, the right optical fiber group 3R that has been moved downward to the position at the height H2 is depicted in dash dot lines, and the right optical fiber group 3R set in the right V-groove group 17R is depicted in thick dotted lines. It may be noted that the height H2 is equal to the height of the upper surface TF1 (see FIG. 5) of the right base member 11R (right optical fiber arrangement portion).

As depicted in the dash dot line in FIG. 6, the first right optical fiber 3R1 comes into contact with the third guide surface GF3 of the right front guide wall 12FR when moved downward to the position at the height H2. With further downward movement, the first right optical fiber 3R1 moves inward (i.e., in the X2 direction) along the third guide surface GF3, and is set in the first right V-groove 17R1 in the end as depicted in the thick dotted line in FIG. 6. This is because the third guide surface GF3 is structured to be inclined toward the right V-groove group 17R when viewed from the right-hand side (from the X2 side) along the direction of extension of the right V-groove group 17R (i.e., Y-axis direction). That is, this is because the third guide surface GF3 is inclined such as to approach the right V-groove group 17R, and is formed as a continuous extension of the first groove surface GS1 of the first right V-groove 17R1 in the right side elevation view.

Similarly, the sixteenth right optical fiber 3R16 comes into contact with the fourth guide surface GF4 of the right rear guide wall 12BR when moved downward to the position at the height H2 as depicted in the dash dot line in FIG. 6. With further downward movement, the sixteenth right optical fiber 3R16 moves inward (i.e., in the X1 direction) along the fourth guide surface GF4, and is set in the sixteenth right V-groove 17R16 in the end as depicted in the thick dotted line in FIG. 6. This is because the fourth guide surface GF4 is inclined such as to approach the right V-groove group 17R in the right side elevation view, and is formed as a continuous extension of the sixteenth groove surface GS16 of the sixteenth right V-groove 17R16.

The second right optical fiber 3R2 when positioned below the height H2 moves inward (i.e., in the X2 direction) as indicated by the dotted arrow in FIG. 6 by being pushed by the first right optical fiber 3R1 moving inward (i.e., in the X2 direction) along the third guide surface GF3. The second right optical fiber 3R2 is set in the second right V-groove 17R2 in the end as depicted in the thick dotted line in FIG. 6. The third right optical fiber 3R3 when positioned below the height H2 moves inward (i.e., in the X2 direction) as indicated by the dotted arrow in FIG. 6 by being pushed by the second right optical fiber 3R2, which moves inward (i.e., in the X2 direction) by being pushed by the first right optical fiber 3R1. The third right optical fiber 3R3 is set in the third right V-groove 17R3 in the end as depicted in the thick dotted line in FIG. 6.

Similarly, the fifteenth right optical fiber 3R15 when positioned below the height H2 moves inward (i.e., in the X1 direction) as indicated by the dotted arrow in FIG. 6 by being pushed by the sixteenth right optical fiber 3R16 moving inward (i.e., in the X1 direction) along the fourth guide surface GF4. The fifteenth right optical fiber 3R15 is set in the fifteenth right V-groove 17R15 in the end as depicted in the thick dotted line in FIG. 6. The fourteenth right optical fiber 3R14 when positioned below the height H2 moves inward (i.e., in the X1 direction) as indicated by the dotted arrow in FIG. 6 by being pushed by the fifteenth right optical fiber 3R15, which moves inward (i.e., in the X1 direction) by being pushed by the sixteenth right optical fiber 3R16. The fourteenth right optical fiber 3R14 is set in the fourteenth right V-groove 17R14 in the end as depicted in the thick dotted line in FIG. 6.

In the example illustrated in FIG. 5 and FIG. 6, the fourth right optical fiber 3R4 through the thirteenth right optical fiber 3R13 are not spread in the width direction even at the position at the height H1. Therefore, the fourth right optical fiber 3R4 through the thirteenth right optical fiber 3R13 are each moved downward without coming into contact with an adjacent optical fiber, followed by being set in the fourth right V-groove 17R4 through the thirteenth right V-groove 17R13, respectively, as indicated by the dotted arrows in FIG. 6.

With this configuration, even when the bare fiber portions of the right optical fiber group 3R (i.e., the first right optical fiber 3R1 through the sixteenth right optical fiber 3R16) are spread in the width direction (i.e., the X-axis direction), the worker can place the bare fiber portions in the right V-groove group 17R without letting them slide out of the right V-groove group 17R.

Further, in the example illustrated in FIG. 5 and FIG. 6, the right guide walls 12R are configured such that their height H1 is significantly greater than the depth of the right V-groove group 17R. The depth of the right V-groove group 17R refers to the distance in the Z-axis direction between the upper surface TF1 of the right base member 11R (i.e., the right optical fiber arrangement portion) and the bottom of the right V-groove group 17R. The right guide walls 12R are further configured such that the inclination angle of the third guide surface GF3 is the same as the inclination angle of the first groove surface GS1, and the inclination angle of the fourth guide surface GF4 is the same as the inclination angle of the sixteenth groove surface GS16. The depth of the right V-groove group 17R and the inclination angles of the groove surfaces are suitably determined such that when the bare fiber portions of the right optical fiber group 3R are set in the V-grooves, the bare fiber portions protrude above the upper surface TF1 of the right base member 11R.

However, the height H1 of the right guide walls 12R and the inclination angles of their guide surfaces GF may be set to any values as long as the right guide walls 12R are configured to cause the spread of the bare fiber portions to converge when the right optical fiber group 3R spread in the width direction (i.e., the X-axis direction) is moved vertically downward. That is, the height H1 of the right guide walls 12R and the inclination angles of the guide surfaces GF thereof may be set to any values as long as the right guide walls 12R are configured to cause the bare fiber portions to extend straight. For example, the height H1 of the right guide walls 12R may be substantially the same as (slightly greater than) the depth of the right V-groove group 17R. Further, the inclination angles of the guide surfaces GF are about 25 degrees in the illustrated example, but may be set to a larger or smaller value.

In the illustrated example, further, the right guide walls 12R are configured such that the distance between the right front guide wall 12FR and the right rear guide wall 12BR at the same level (height) as the upper surface TF1 of the right base member 11R is the same as the width of the right V-groove group 17R. In addition to this arrangement, the right guide walls 12R are configured to have the distance therebetween increasing upward. Alternatively, the right guide walls 12R may be configured such that the distance between the right front guide wall 12FR and the right rear guide wall 12BR at the same level (height) as the upper surface TF1 of the right base member 11R is greater than the width of the right V-groove group 17R.

In the illustrated example, moreover, the guide surfaces GF are flat surfaces, and are configured such that the direction normal thereto is perpendicular to the direction of extension of the right V-groove group 17R (i.e., the Y-axis direction) in a top view. Alternatively, the guide surfaces GF may be configured such that the direction normal thereto obliquely crosses the direction of extension of the right V-groove group 17R (i.e., the Y-axis direction) in a top view.

Figure 7:
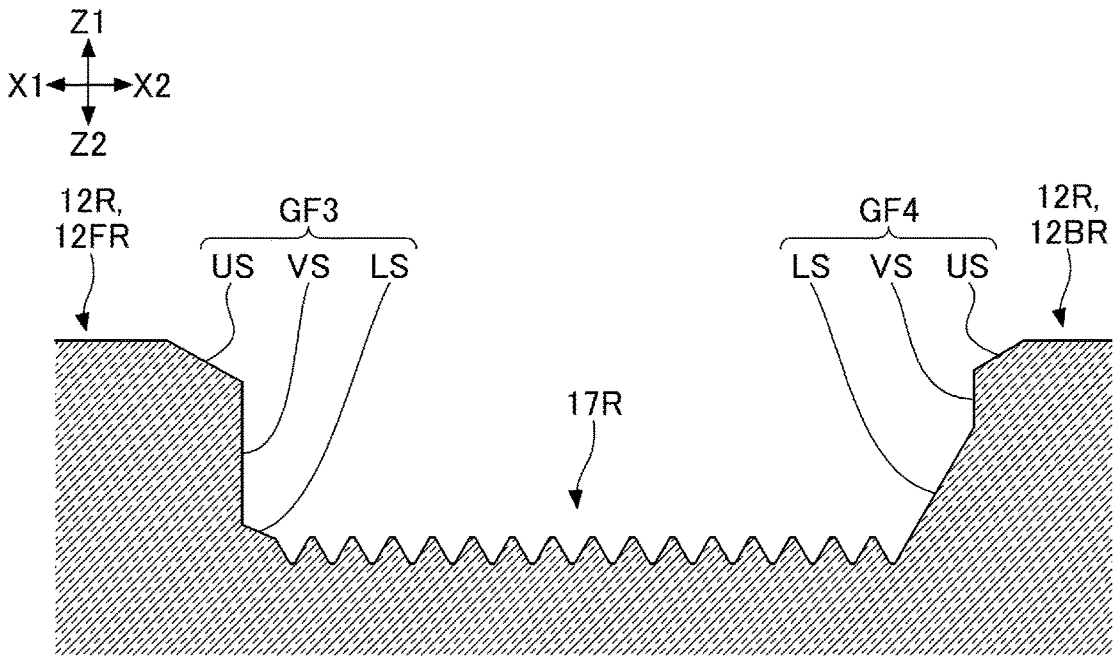
FIG. 7 is a partial cross-sectional view of a right base member.
Figure 8:
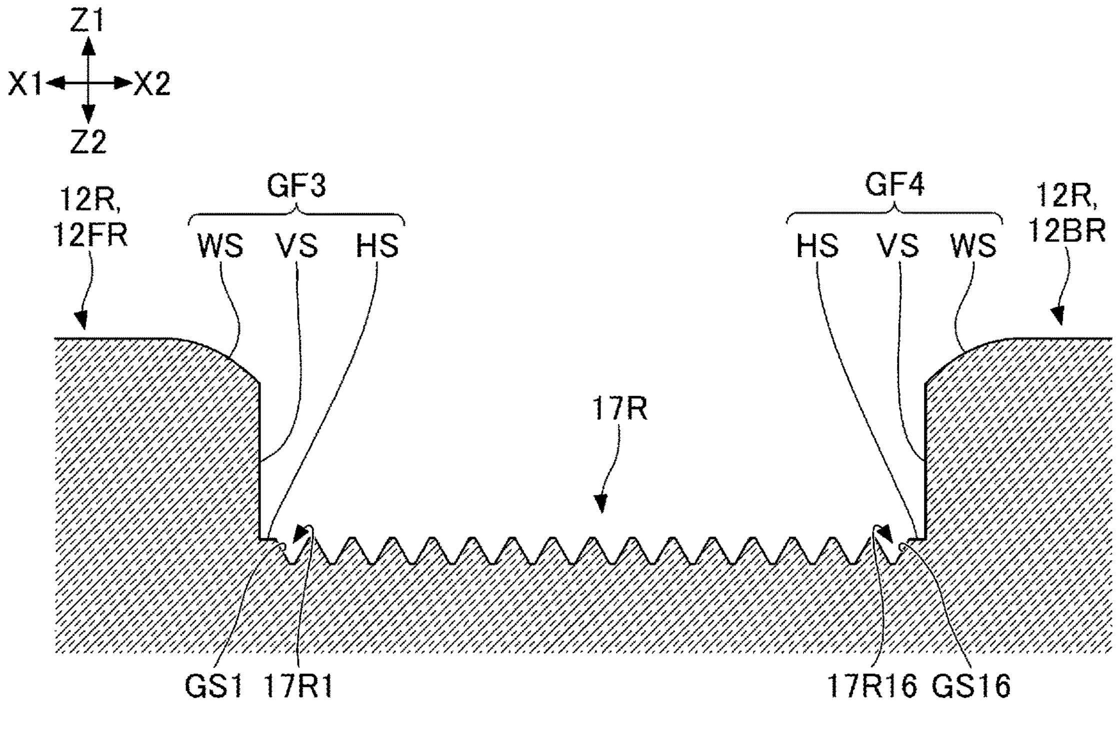
FIG. 8 is a partial cross-sectional view of a right base member.
Figure 9:
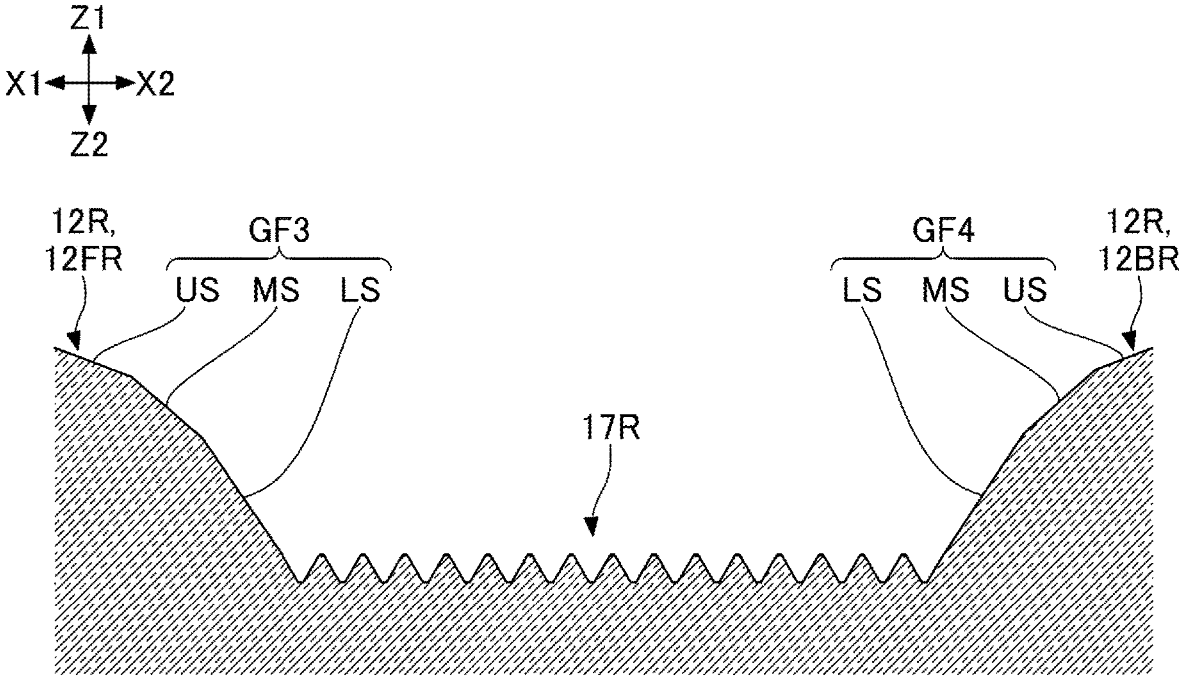
FIG. 9 is a partial cross-sectional view of a right base member.

In the following, another example of the configuration of the guide walls 12 will be described with reference to FIG. 7 through FIG. 9. FIG. 7 through FIG. 9 are partial cross-sectional views of the right base member 11R including the right V-groove group 17R, and correspond to FIG. 6. The following description given with reference to FIG. 7 through FIG. 9 relates to the right guide walls 12R functioning together with the right V-groove group 17R, but similarly applies to the left guide walls 12L (not visible in FIG. 7 through FIG. 9) functioning together with the left V-groove group 17L.

The right guide walls 12R illustrated in FIG. 7 differ from the right guide walls 12R illustrated in FIG. 6 in that the third guide surface GF3 and the fourth guide surface GF4 each include a vertical face (i.e., middle vertical surface VS), but is the same as the right guide walls 12R illustrated in FIG. 6 in other aspects. In the following be description, thus, different aspects will described in detail while omitting a description of the common aspects.

In the example illustrated in FIG. 7, the third guide surface GF3 of the right front guide wall 12FR includes an upper inclined surface US, the middle vertical surface VS, and a lower inclined surface LS. Both the upper inclined surface US and the lower inclined surface LS are structured to be inclined toward the right V-groove group 17R. The same applies to the fourth guide surface GF4 of the right rear guide wall 12BR.

In the third guide surface GF3, the inclination angle of the upper inclined surface US and the inclination angle of the lower inclined surface LS are the same. Alternatively, the inclination angle of the upper inclined surface US and the inclination angle of the lower inclined surface LS may differ from each other. In this specification, the inclination angle of the upper inclined surface US refers to an angle formed between the upper inclined surface US and a vertical plane. The same applies to the inclination angle of the lower inclined surface LS.

An increase in the inclination angles of the upper inclined surface US and the lower inclined surface LS serves to increase the distance of inward movement (toward the X2 direction) of the first right optical fiber 3R1 caused by the downward movement of the right optical fiber group 3R. This yields the result that the deviation of the first right optical fiber 3R1 in the width direction quickly converges.

Conversely, a decrease in the inclination angles of the upper inclined surface US and the lower inclined surface LS serves to decrease the distance of inward movement (toward the X2 direction) of the first right optical fiber 3R1 caused by the downward movement of the right optical fiber group 3R. This achieves the result that the spread of the right optical fiber group 3R in the width direction gradually converges.

Accordingly, the inclination angles of both the upper inclined surface US and the lower inclined surface LS are suitably set according to the circumstances or the like in which of the fusion splicer 1 is used.

In the example illustrated in FIG. 7, the fourth guide surface GF4 of the right rear guide wall 12BR includes an upper inclined surface US, the middle vertical surface VS, and a lower inclined surface LS, like the third guide surface GF3 of the right front guide wall 12FR. Both the upper inclined surface US and the lower inclined surface LS are structured to be inclined toward the right V-groove group 17R. In the fourth guide surface GF4, unlike the third guide surface GF3, the upper inclined surface US is structured such that the inclination angle thereof is greater than the inclination angle of the lower inclined surface LS. Alternatively, the upper inclined surface US may be structured such that the inclination angle thereof is smaller than the inclination angle of the lower inclined surface LS, or may be structured such that the inclination angle thereof is the same as the inclination angle of the lower inclined surface LS.

In the example illustrated in FIG. 7, the right guide walls 12R are structured such that the shape of the third guide surface GF3 of the right front guide wall 12FR and the shape of the fourth guide surface GF4 of the right rear guide wall 12BR are asymmetric with respect to the YZ plane. Alternatively, t guide walls 12R may be structured such that the shape of the third guide surface GF3 of the right front guide wall 12FR and the shape of the fourth guide surface GF4 of the right rear guide wall 12BR are symmetrical with respect to the YZ plane, similarly to the example illustrated in FIG. 6.

The right guide walls 12R illustrated in FIG. 8 differ from the right guide walls 12R illustrated in FIG. 7 in that the third guide surface GF3 and the fourth guide surface GF4 each include a curved surface (i.e., upper curved surface WS) and a horizontal surface (i.e., lower horizontal surface HS), but are the same as the right guide walls 12R illustrated in FIG. 7 in other aspects. In the following description, different aspects will be described in detail while omitting a description of the common aspects.

In the example illustrated in FIG. 8, the third guide surface GF3 of the right front guide wall 12FR includes the upper curved surface WS, a middle vertical surface VS, and the lower horizontal surface HS. The upper curved surface WS is structured to be inclined toward the right V-groove group 17R. The same applies to the fourth guide surface GF4 of the right rear guide wall 12BR. The right guide walls 12R are structured such that the shape of the third guide surface GF3 of the right front guide wall 12FR and the shape of the fourth guide surface GF4 of the right rear guide wall 12BR are symmetrical with respect to the YZ plane. Alternatively, the right guide walls 12R may be structured such that the shape of the third guide surface GF3 of the right front guide wall 12FR and the shape of the fourth guide surface GF4 of the right rear guide wall 12BR are asymmetric with respect to the YZ plane.

The upper curved surface WS is structured such that the inclination angle gradually decreases, but may include a portion in which the inclination angle gradually increases.

The configuration of the third guide surface GF3 including the lower horizontal surface HS is intended to clearly indicate that the vertical surface or the inclined surface belonging to the third guide surface GF3 and the first groove surface GS1 of the first right V-groove 17R1 may not be continuous with each other.

In this case, the lower horizontal surface HS is structured such that the length (i.e., span) thereof in the width direction (i.e., X-axis direction) is smaller than the diameter of the first right optical fiber 3R1. This is to prevent the first right optical fiber 3R1 from remaining on the lower horizontal surface HS when the right optical fiber group 3R is set in the right V-groove group 17R. Preferably, the lower horizontal surface HS is structured such that the length (i.e., span) thereof in the width direction (i.e., X-axis direction) is smaller than the radius of the first right optical fiber 3R1. It may be noted that either the middle vertical surface VS, the lower horizontal surface HS, or both may be omitted. That is, the third guide surface GF3 may be constituted only by the upper curved surface WS, constituted by the combination of the upper curved surface WS and the middle vertical surface VS, or constituted by the combination of the upper curved surface WS and the lower horizontal surface HS.

The right guide walls 12R illustrated in FIG. 9 differ from the right guide walls 12R illustrated in FIG. 6 in that the third guide surface GF3 and the fourth guide surface GF4 each include a plurality of inclined surfaces, but are the same as the right guide walls 12R illustrated in FIG. 6 in other aspects. In the following description, thus, different aspects will be described in detail while omitting a description of the common aspects.

In the example illustrated in FIG. 9, the third guide surface GF3 of the right front guide wall 12FR includes an upper inclined surface US, a middle inclined surface MS, and a lower inclined surface LS. The upper inclined surface US, the middle inclined surface MS, and the lower inclined surface LS are each structured to be inclined toward the right V-groove group 17R. The same applies to the fourth guide surface GF4 of the right rear guide wall 12BR. The right guide walls 12R are structured such that the shape of the third guide surface GF3 of the right front guide wall 12FR and the shape of the fourth guide surface GF4 of the right rear guide wall 12BR are symmetrical with respect to the YZ plane. Alternatively, the right guide walls 12R may be structured such that the shape of the third guide surface GF3 of the right front guide wall 12FR and the shape of the fourth guide surface GF4 of the right rear guide wall 12BR are asymmetric with respect to the YZ plane.

In the third guide surface GF3, the upper inclined surface US is structured such that the inclination angle thereof is greater than the inclination angle of the middle inclined surface MS, and the middle inclined surface MS is structured such that the inclination angle thereof is greater than the inclination angle of the lower inclined surface LS. Alternatively, the inclination angles of the upper inclined surface US, the middle inclined surface MS, and the lower inclined surface LS may be set to have any relative magnitude. For example, the upper inclined surface US may be structured such that the inclination angle thereof is smaller than the inclination angle of the middle inclined surface MS, and the middle inclined surface MS may be structured such that the inclination angle thereof is smaller than the inclination angle of the lower inclined surface LS.

In the following, still another example of the configuration of the guide walls 12 will be described with reference to FIG. 10A through FIG. 10I. FIG. 10A through FIG. 10I are top views of the right base member 11R including the right V-groove group 17R. The following description referring to FIG. 10A through FIG. 10I is directed to the right guide walls 12R that function together with the right V-groove group 17R. The same also applies to the left guide walls 12L (not visible in FIG. 10A through FIG. 10I) functioning together with the left V-groove group 17L.

Figure 10A:
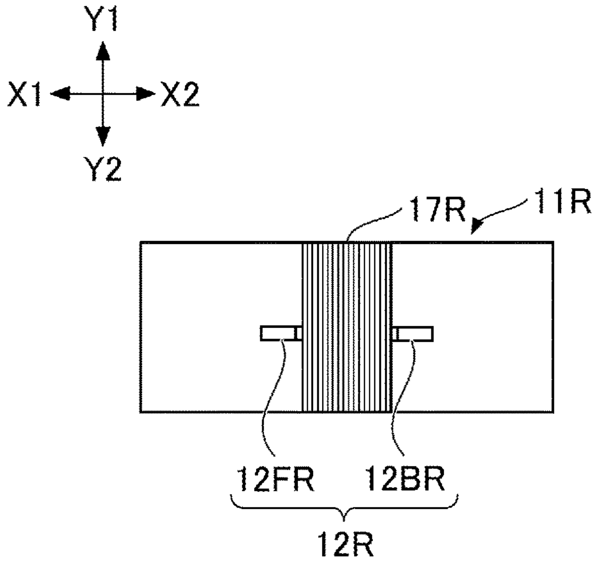
FIG. 10A is a top view of an example of a right base member.

The right guide walls 12R illustrated in FIG. 10A differ from the right guide walls 12R illustrated in FIG. 5, which are disposed at the right end (i.e., the end toward the Y2 direction) of the right base member 11R in the right-left direction (i.e., the Y-axis direction), in that right guide walls are disposed at the center of the right base member 11R in the right-left direction (i.e., the Y-axis direction).

Figure 10B:
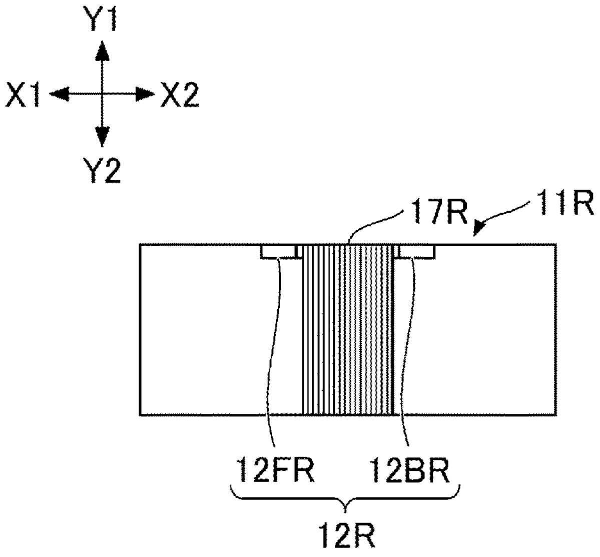
FIG. 10B is a top view of another example of a right base member.

The right guide walls 12R illustrated in FIG. 10B differ from the right guide walls 12R illustrated in FIG. 5, which are disposed at the right end (i.e., the end toward the Y2 direction) of the right base member 11R in the right-left direction (i.e., Y-axis direction), in that right guide walls are disposed at the left end (i.e., the end toward the Y1 direction) of the right base member 11R in the right-left direction (Y-axis direction).

Figure 10C:
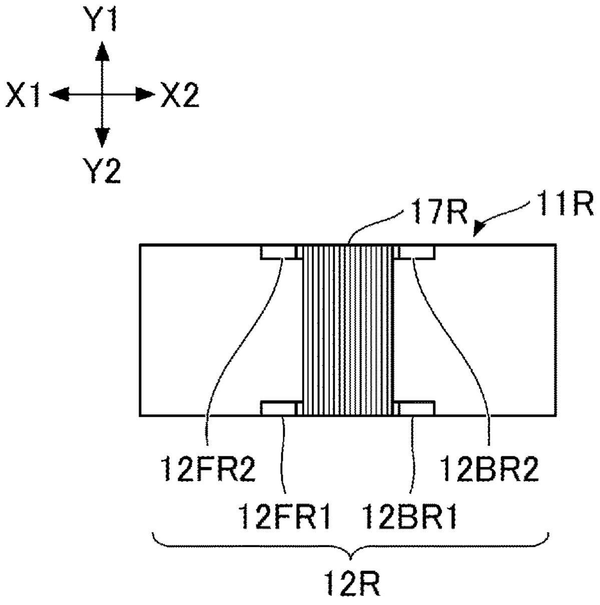
FIG. 10C is a top view of another example of a right base member.

The right guide walls 12R illustrated in FIG. 10C differ from the right guide walls 12R illustrated in FIG. 5, which are disposed only at the right end (i.e., the end toward the Y2 direction) of the right base member 11R in the right-left direction (i.e., Y-axis direction), in that right guide walls are disposed at both the left end and the right end of the right base member 11R in the right-left direction (i.e., Y-axis direction).

Further, the right guide walls 12R illustrated in FIG. 10C differ from the right guide walls 12R illustrated in FIG. 5, which are constituted by two parts (i.e., the right front guide wall 12FR and the right rear guide wall 12BR), in that right guide walls are constituted by four parts (i.e., the first right front guide wall 12FR1, the second right front guide wall 12FR2, the first right rear guide wall 12BR1, and the second right rear guide wall 12BR2).

In the example illustrated in FIG. 10C, the right guide walls 12R may be configured such that the inclination angle of the guide surface of the first right front guide wall 12FR1 and the first right rear guide wall 12BR1 differs from the inclination angle of the guide surface of the second right front guide wall 12FR2 and the second right rear guide wall 12BR2. This is because the degree of spread in the width direction of the bare fiber portions at the left end (i.e., end towards Y1 direction) of the right base member 11R is larger than the degree of spread in the width direction of the bare fiber portions at the right end (i.e., the end toward Y2 direction) of the right base member 11R. For the same reason, the right guide walls 12R may be configured such that the distance between the guide surface of the first right front guide wall 12FR1 and the guide surface of the first right rear guide wall 12BR1 is smaller than the distance between the guide surface of the second right front guide wall 12FR2 and the guide surface of the second right rear guide wall 12BR2 at the same height.

Figure 10D:
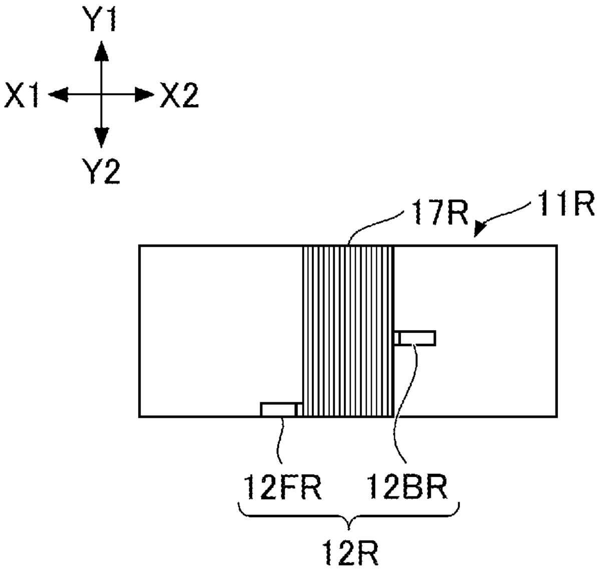
FIG. 10D is a top view of another example of a right base member.

The right guide walls 12R illustrated in FIG. 10D differ from the right guide walls 12R illustrated in FIG. 5, which have both the right front guide wall 12FR and right rear guide wall 12BR disposed at the right end (i.e., the end toward the Y2 direction) of the right base member 11R in the right-left direction (i.e., Y-axis direction), in that the right front guide wall 12FR is disposed at the right end of the right base member 11R and the right rear guide wall 12BR is disposed at the center of the right base member 11R in the right-left direction (i.e., Y-axis direction).

The right guide walls 12R illustrated in FIG. 10D differ from the right guide walls 12R of FIG. 5, which have the right front guide wall 12FR and the right rear guide wall 12BR facing each other in the front-rear direction (i.e., X-axis direction), in that the right front guide wall 12FR and the right rear guide wall 12BR do not face each other in the front-rear direction (i.e., X-axis direction).

In the example illustrated in FIG. 10A to FIG. 10D, the right guide walls 12R are configured such that the thickness thereof (i.e., length in the Y-axis direction) is significantly smaller than the entire length (i.e., length in the Y-axis direction) of the right V-groove group 17R. Alternatively, the right guide walls 12R may be configured to have any thickness. For example, the thickness of the right guide walls 12R may be configured to be the same as the entire length of the right V-groove group 17R, or may be configured to be about one half or one third of the entire length of the right V-groove group 17R.

Figure 10E:
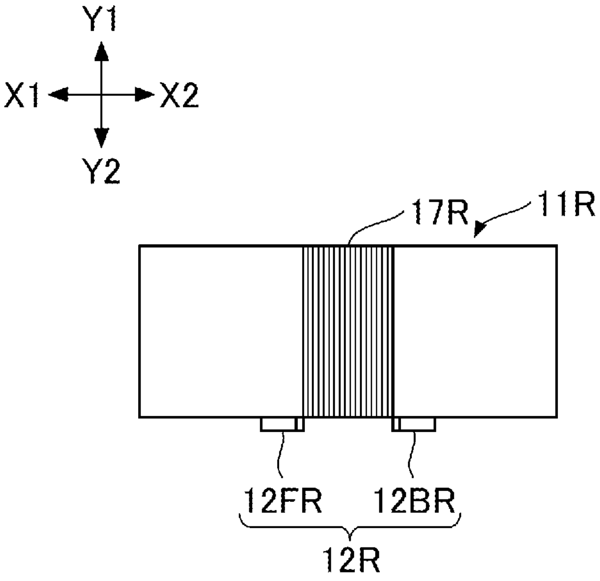
FIG. 10E is a top view of another example of a right base member.
Figure 10F:
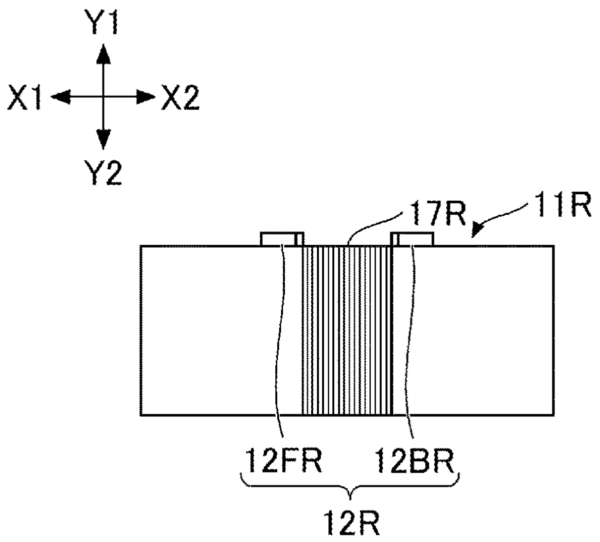
FIG. 10F is a top view of another example of a right base member.

The right guide walls 12R illustrated in FIG. 10E and FIG. 10F differ from the right guide walls 12R illustrated in FIG. 5, which are disposed alongside the right V-groove group 17R in the front-rear direction (i.e., X-axis direction), in that the right guide walls are not alongside the right V-groove group 17R in the front-rear direction (i.e., X-axis direction).

To be more specific, the right guide walls 12R illustrated in FIG. 10E differ from the right guide walls 12R illustrated in FIG. 5, which are disposed alongside the right V-groove group 17R in the front-rear direction (i.e., X-axis direction), in that the right guide walls are disposed to protrude rightward (i.e., in the Y2 direction) from the right end of the right base member 11R.

Moreover, the right guide walls 12R illustrated in FIG. 10F differ from the right guide walls 12R illustrated in FIG. 5, which are disposed alongside the right V-groove group 17R in the front-rear direction (i.e., X-axis direction), in that the right guide walls are disposed to protrude leftward (i.e., in the Y1 direction) from the left end of the right base member 11R.

As described above, the right guide walls 12R do not have to be structured to be alongside the right V-groove group 17R in the front-rear direction (i.e., X-axis direction), and may be disposed to protrude leftward (i.e., in the Y1 direction) from the left end of the right base member 11R or rightward (i.e., in the Y2 direction) from the right end of the right base member 11R.

Figure 10G:
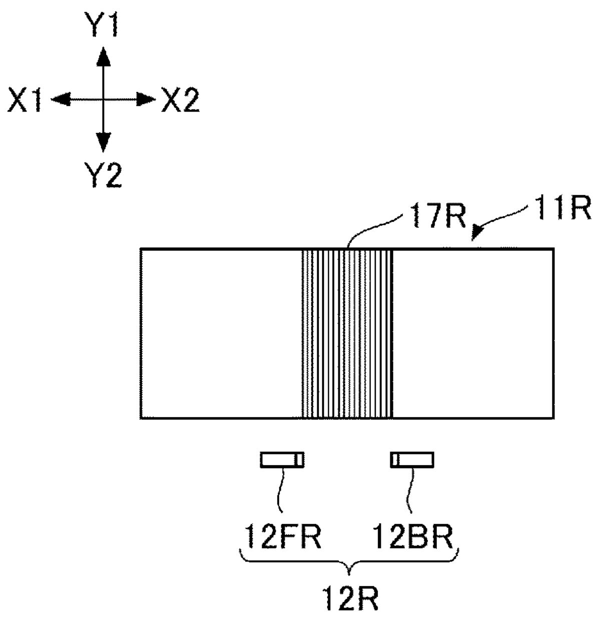
FIG. 10G is a top view of another example of a right base member.
Figure 10H:
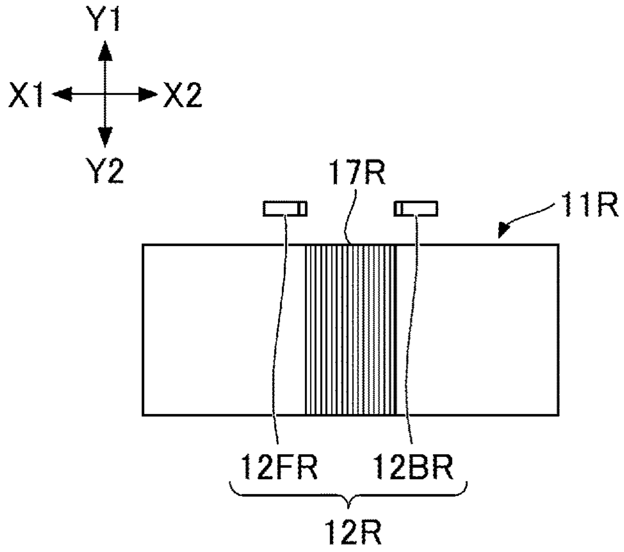
FIG. 10H is a top view of another example of a right base member.

The right guide walls 12R illustrated in FIG. 10G and FIG. 10H differ from the right guide walls 12R illustrated in FIG. 5, which are formed as part of the right base member 11R, in that the right guide walls are formed as a member separate from the right base member 11R.

To be more specific, the right guide walls 12R illustrated in FIG. 10G differ from the right guide walls 12R illustrated in FIG. 5, which are integrally formed as part of the right base member 11R, in that the right guide walls are disposed apart, to the right (i.e., in the Y2 direction), from the right end of the right base member 11R.

Moreover, the right guide walls 12R illustrated in the FIG. 10H differ from the right guide walls 12R illustrated in FIG. 5, which are integrally formed as part of the right base member 11R, in that the right guide walls are disposed apart, to the right (i.e., in the Y1 direction), from the left end of the right base member 11R.

As described above, the right guide walls 12R may be disposed apart from the right base member 11R. Further, the right guide walls 12R may be formed of a material different from that of the right base member 11R.

In the example illustrated in FIG. 10G, the right base member 11R is formed of a heat-resistant ceramic such as zirconia. This is because of exposure to high temperature due to arc discharge generated by the electrode rod 5. On the other hand, the right guide walls 12R are formed of a metal such as stainless steel because the right guide walls are positioned not to be exposed to high temperature caused by the arc discharge and also positioned not to affect the arc discharge electromagnetically. The right guide walls 12R may be formed of a synthetic resinous material.

Figure 10I:
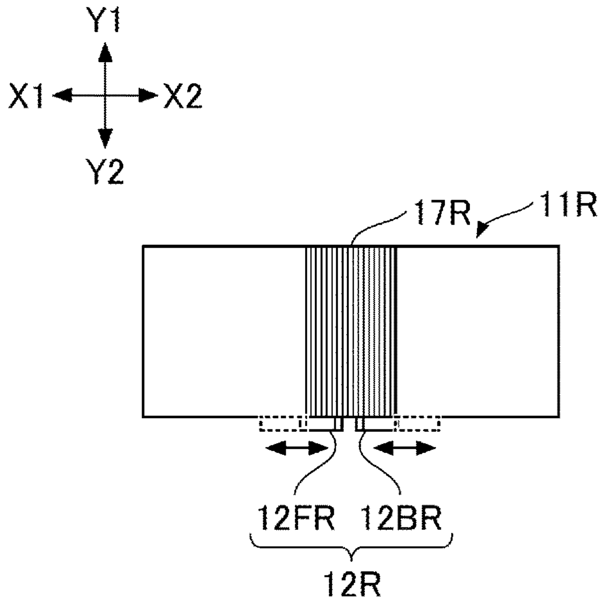
FIG. 10I is a top view of another example of a right base member.

The right guide walls 12R illustrated in FIG. 10I differ from the right guide walls 12R of FIG. 10E, which are structured to be immovable in the front-rear direction (i.e., X-axis direction), in that the right guide walls are structured to be movable in the front-rear direction (i.e., X-axis direction).

FIG. 10I illustrates the right guide walls 12R in the state in which the distance between the right front guide wall 12FR and the right rear guide wall 12BR is minimum. Figures depicted in the dotted lines in FIG. 10I illustrate the right guide walls 12R in the state in which the distance between the right front guide wall 12FR and the right rear guide wall 12BR is maximum. The double-headed arrows in FIG. 10I indicate the directions of respective movement of the right front guide wall 12FR and the right rear guide wall 12BR.

This configuration is suitably used when fusion splicing is performed by using less than 16 (for example, 4, 8, or 12) V-grooves among the 16 V-grooves with respect to a ribbon cable having a smaller number of fibers (e.g., a ribbon cable having 4 fibers, 8 fibers, or 12 fibers) than the 16-core ribbon cable.

To be specific, when performing fusion splicing of a 4-core ribbon cable, the operator moves the right front guide wall 12FR and the right rear guide wall 12BR such that the distance between the right front guide wall 12FR and the right rear guide wall 12BR becomes equal to the width of 4 V-grooves. To be more specific, the operator moves the right front guide wall 12FR rearward (i.e., in the X2 direction) and moves the right rear guide wall 12BR forward (i.e., in the X1 direction). The right guide walls 12R depicted in solid lines in FIG. 10I are in a state suitable for fusion splicing of a 4-core ribbon cable.

When performing fusion splicing of a 16-core ribbon cable, the operator moves the right front guide wall 12FR and the right rear guide wall 12BR such that the distance between the right front guide wall 12FR and the right rear guide wall 12BR is equal to the width of 16 V-grooves. To be more specific, the operator moves the right front guide wall 12FR forward (i.e., in the X1 direction) and moves the right rear guide wall 12BR rearward (i.e., in the X2 direction). The right guide walls 12R depicted in the dotted lines in FIG. 10I are in a state suitable for fusion splicing of a 16-core ribbon cable.

In the example illustrated in FIG. 10I, the right guide walls 12R are configured such that both the right front guide wall 12FR and the right rear guide wall 12BR are movable in the front-rear direction (i.e., X-axis direction). Alternatively, the right guide walls 12R may be configured such that either the right front guide wall 12FR or the right rear guide wall 12BR is movable in the front-rear direction (i.e., X-axis direction). The right guide walls 12R movable in the front-rear direction as illustrated in FIG. 10I may be applied to the configurations illustrated in FIG. 5 to FIG. 9 and FIG. 10A to FIG. 10H.

As described above, the fusion splicer 1 according to the embodiment of the present disclosure is configured such that the optical fibers (i.e., the first right optical fiber 3AR through the fourth right optical fiber 3DR) arranged in side by side along the direction (i.e., X-axis direction) intersecting the longitudinal direction (i.e., Y-axis direction) are fusion-spliced to the respective other optical fibers (i.e., the first left optical fiber 3AL through the fourth left optical fibers 3DL), as illustrated in FIG. 1 and FIG. 2A to FIG. 2C. To be specific, the fusion splicer 1 includes the right base member 11R with a groove portion (i.e., the right V-groove group 17R) having V-grooves (i.e., the first right V-groove 17AR through the fourth right V-groove 17DR) formed therein for setting optical fibers (i.e., the first right optical fiber 3AR through the fourth right optical fiber 3DR), and includes a pair of guide walls (i.e., the right front guide wall 12FR and the right rear guide wall 12BR) for guiding the setting of the optical fibers (i.e., the first right optical fiber 3AR through the fourth right optical fiber 3DR) into the V-grooves (i.e., the first right V-groove 17AR through the fourth right V-groove 17DR). The pair of guide walls (i.e., the right front guide wall 12FR and the right rear guide wall 12BR) are disposed at an interval in the width direction (i.e., X-axis direction) of the right V-groove group 17R. The right front guide wall 12FR has the third guide surface GF3 which comes into contact with the first right optical fiber 3AR, which is one of the optical fibers (i.e., the first right optical fiber 3AR through the fourth right optical fiber 3DR), and the right rear guide wall 12BR has the fourth guide surface GF4 which comes into contact with the fourth right optical fiber 3DR, which is another one of the optical fibers (i.e., the first right optical fiber 3AR through the fourth right optical fiber 3DR). The third guide surface GF3 and the fourth guide surface GF4 each include a portion inclined toward the right V-groove group 17R when viewed along the direction of extension (i.e., Y-axis direction) of the V-grooves (i.e., the first right V-groove 17AR through the fourth right V-groove 17DR), that is, in the right side elevation view.

The optical fibers fusion-spliced by the fusion splicer 1 are the bare fiber portions of the four optical fibers belonging to the 4-core ribbon cable in the example illustrated in FIG. 1 and FIG. 2A to FIG. 2C, but may alternatively be the bare fiber portions of optical fibers belonging to a rollable ribbon cable. The number of optical fibers of a ribbon cable may be 8 fibers, 12 fibers, 16 fibers, 24 fibers, or the like. In the example illustrated in FIG. 5 and FIG. 6, the number of optical fibers of the ribbon cable is 16.

In this configuration, the guide walls 12 push back, inward in the width direction, the bare fiber portions of the optical fiber group 3 that have been spread outward in the width direction (i.e., X-axis direction) as illustrated in FIG. 2B, thereby realizing a correct state in which the bare fiber portions extend straight as illustrated in FIG. 2C. This configuration thus serves to prevent the bare fiber portions from sliding out of the V-grooves.

Further, when viewed along the direction of extension (i.e., Y-axis direction) of the V-grooves (i.e., the first right V-groove 17R1 through the sixteenth right V-groove 17R16) as illustrated in FIG. 6, namely, in the right side elevation view as illustrated in FIG. 6, the guide surfaces GF may each be disposed as a continuous extension of one of the groove surfaces of the V-grooves. To be more specific, as illustrated in FIG. 6, the third guide surface GF3 may be disposed as a continuous extension of the first groove surface GS1 of the first right V-groove 17R1, and the fourth guide surface GF4 may be disposed as a continuous extension of the sixteenth groove surface GS16 of the sixteenth right V-groove 17R16.

In the above-noted configuration in which the third guide surface GF3 and the first groove surface GS1 are continuous with each other, the right front guide wall 12FR is able to guide the first right optical fiber 3R1 into the first right V-groove 17R1 without disturbing the movement of the first right optical fiber 3R1 moving along the third guide surface GF3. This configuration can thus further reduce the likelihood of the bare fiber portion sliding out of the V-groove.

The pair of guide walls may be formed as members separate from the base member 11, or may be integrated with the base member 11. For example, the right front guide wall 12FR and the right rear guide wall 12BR, which are a pair of guide walls, may be integrated with the right base member 11R as illustrated in FIG. 10A through FIG. 10F, or may be formed as a member separate from the right base member 11R as illustrated in FIG. 10G through FIG. 10I.

Further, at least one of guide walls constituting the pair may be configured to be movable relative to the groove portion such that the size of the gap in the width direction of the groove portion is adjustable. For example, the right front guide wall 12FR and the right rear guide wall 12BR, which are a pair of guide walls, may be configured to be movable in the X-axis direction relative to the right V-groove group 17R such that the size of the interval in the width direction (i.e., X-axis direction) of the right V-groove group 17R is adjustable as illustrated in FIG. 10I.

As illustrated in FIG. 1 and FIG. 2A through FIG. 2C, the method of splicing optical fibers according to the embodiment of the present disclosure is an optical fiber splicing method by which optical fibers (i.e., the first right optical fiber 3AR through the fourth right optical fiber 3DR) are fusion-spliced to respective other optical fibers (i.e., the first left optical fiber 3AL through the fourth left optical fiber 3DL) by using the fusion splicer 1, which includes the right base member 11R with a groove portion (i.e., the right V-groove group 17R) having V-grooves (i.e., the first right V-groove 17AR through the fourth right V-groove 17DR) formed therein for setting optical fibers (i.e., the first right optical fiber 3AR through the fourth right optical fiber 3DR), and includes a pair of guide walls (i.e., the right front guide wall 12FR and the right rear guide wall 12BR) for guiding the setting of the optical fibers (i.e., the first right optical fiber 3AR through the fourth right optical fiber 3DR) to the V-grooves (i.e., the first right V-groove 17AR through the fourth right V-groove 17DR).

This splicing method includes a step of placing a plurality of optical fibers in a plurality of V-grooves while bringing one of the plurality of optical fibers into contact with one guide surface of a pair of the guide walls disposed at an interval in the width direction of a groove portion, and a step of fusion-splicing the optical fibers to respective other optical fibers.

To be more specific, as illustrated in FIGS. 2A through 2C, the splicing method includes a step of placing a plurality of optical fibers (i.e., the first right optical fiber 3AR through the fourth right optical fiber 3DR) in a plurality of V-grooves (i.e., the first right V-groove 17AR through the fourth right V-groove 17DR) while bringing the first right optical fiber 3AR into contact with the third guide surface GF3 of the right front guide wall 12FR, or bringing the fourth right optical fiber 3DR into contact with the fourth guide surface GF4 of the right rear guide wall 12BR, and a step of fusion-splicing the optical fibers (i.e., the first right optical fiber 3AR through the fourth right optical fiber 3DR) to respective other optical fibers (i.e., first left optical fiber 3AL through the fourth left optical fiber 3DL).

By this method, the bare fiber portions of the optical fiber group 3 (i.e., the left optical fiber group 3L or the right optical fiber group 3R) spread outward in the width direction (i.e., X-axis direction) as illustrated in FIG. 2B are push back inward in the width direction to cause a correct state in which the bare fiber portions extend straight as illustrated in FIG. 2C, followed by fusion-splicing the left optical fiber group 3L and the right optical fiber group 3R. This method can thus reduce the likelihood of the bare fiber portions sliding out of the V-grooves, and can thereby reduce the likelihood of a failure or redoing of fusion splicing.

Preferred embodiments of present the disclosure have heretofore been described in detail. The disclosed embodiments are, however, to be considered in all respects as illustrative and not restrictive. The scope of the present invention is defined by the appended claims rather than by the foregoing description, and is intended to include all modifications within the scope and meaning equivalent to the appended claims. That is, the present invention is not limited to the above-described embodiments. Various modifications, substitutions, and the like may be made to the above-described embodiments without departing from the scope of the present invention. In addition, each of the features described with reference to the embodiments described above may suitably be combined as long as there is no technical contradiction.

DESCRIPTION OF SYMBOLS

1 . . . fusion splicer
3 . . . optical fiber group
3A . . . first optical fiber pair
3AL . . . first left optical fiber
3AR . . . first right optical fiber
3B . . . second optical fiber pair
3BL . . . second left optical fiber
3BR . . . second right optical fiber
3C . . . third optical fiber pair
3CL . . . third left optical fiber
3CR . . . third right optical fiber
3D . . . fourth optical fiber pair
3DL . . . fourth left optical fiber
3DR . . . fourth right optical fiber
3L . . . left optical fiber group
3R . . . right optical fiber group
3R1 . . . first right optical fiber
3R2 . . . second right optical fiber
3R3 . . . third right optical fiber
3R4 . . . fourth right optical fiber
3R5 . . . fifth right optical fiber
3R6 . . . sixth right optical fiber
3R7 . . . seventh right optical fiber
3R8 . . . eighth right optical fiber
3R9 . . . ninth right optical fiber
3R10 . . . tenth right optical fiber
3R11 . . . eleventh right optical fiber
3R12 . . . twelfth right optical fiber
3R13 . . . thirteenth right optical fiber
3R14 . . . fourteenth right optical fiber
3R15 . . . fifteenth right optical fiber
3R16 . . . sixteenth right optical fiber
4L . . . left ribbon cable
4R . . . right ribbon cable
5 . . . electrode rod
5B . . . rear electrode rod
5Ba . . . tip
5F . . . front electrode rod
5Fa . . . tip
11 . . . base member
11L . . . left base member
11R . . . right base member
12 . . . guide wall
12BL . . . left rear guide wall
12BR . . . right rear guide wall
12BR1 . . . first right rear guide wall
12BR2 . . . second right rear guide wall
12FL . . . left front guide wall
12FR . . . right front guide wall
12FR1 . . . first right front guide wall
12FR2 . . . second right front guide wall
12L . . . left guide wall
12R . . . right guide wall
17 . . . V-groove group
17A . . . first V-groove pair
17AL . . . first left V-groove
17AR . . . first right V-groove
17B . . . second V-groove pair
17BL . . . second left V-groove
17BR . . . second right V-groove
17C . . . third V-groove pair
17CL . . . third left V-groove
17CR . . . third right V-groove
17D . . . fourth V-groove pair
17DL . . . fourth left V-groove
17DR . . . fourth right V-groove
17L . . . left V-groove group
17R . . . right V-groove group
17R1 . . . first right V-groove
17R2 . . . second right V-groove
17R3 . . . third right V-groove
17R4 . . . fourth right V-groove
17R5 . . . fifth right V-groove
17R6 . . . sixth right V-groove
17R7 . . . seventh right V-groove
17R8 . . . eighth right V-groove
17R9 . . . ninth right V-groove
17R10 . . . tenth right V-groove
17R11 . . . eleventh right V-groove
17R12 . . . twelfth right V-groove
17R13 . . . thirteenth right V-groove
17R14 . . . fourteenth right V-groove
17R15 . . . fifteenth right V-groove
17R16 . . . sixteenth right V-groove
21La . . . left arm portion
21Lb . . . left pressing portion
21R . . . right clamp
21Ra . . . right arm portion
21Rb . . . right pressing portion
31 . . . fiber holder
31L . . . left fiber holder
31La left fiber holder body
31Lb . . . left cover
31R . . . right fiber holder

31Ra . . . right fiber holder body
31Rb . . . right lid
51 . . . imaging device
52 . . . fusion device
53 . . . clamp driving device
54 . . . fiber holder driving device
55 . . . display device
60 . . . control device
GF . . . guide surface
GF1 . . . first guide surface
GF2 . . . second guide surface
GF3 . . . third guide surface
GF4 . . . fourth guide surface
GS1 . . . first groove surface
GS16 . . . sixteenth groove surface
HS . . . lower horizontal plane
LS . . . lower inclined surface
MS . . . middle inclined surface
TF1, TF2 . . . upper surface
US . . . upper inclined surface
VS . . . middle vertical surface
WS . . . upper curved surface

The invention claimed is:

1. A fusion splicer for fusion-splicing a plurality of optical fibers, arranged side by side along a direction intersecting a longitudinal direction, with respective other optical fibers, comprising:

- a base member with a groove portion having a plurality of V-grooves formed therein for setting the plurality of optical fibers; and
- a pair of guide walls configured to guide setting of the plurality of optical fibers into the plurality of V-grooves,
- wherein the guide walls are disposed at an interval in a width direction of the groove portion,
- one of the guide walls constituting the pair has a guide surface capable of coming into contact with one of the plurality of optical fibers,
- another one of the guide walls constituting the pair has a guide surface capable of coming into contact with another one of the plurality of optical fibers,
- each guide surface includes a portion inclined toward the groove portion when viewed along a direction of extension of the plurality of V-grooves,
- thicknesses of the guide walls along the longitudinal direction of the plurality of optical fibers are each less than or equal to half of an overall length of the plurality of V-grooves, and
- a height of the guide walls is greater than a depth of the plurality of V-grooves.

2. The fusion splicer as claimed in claim 1, wherein each guide surface is disposed as a continuous extension of a groove surface of one of the plurality of V-grooves when viewed along the direction of extension of the plurality of V-grooves.

3. The fusion splicer as claimed in claim 1, wherein the pair of guide walls is formed as a member separate from the base member.

4. The fusion splicer as claimed in claim 1, wherein the pair of guide walls is integrated with the base member.

5. The fusion splicer as claimed in claim 1, wherein at least one of the guide walls constituting the pair is configured to be movable relative to the groove portion in the width direction.

6. An optical fiber splicing method of fusion-spicing a plurality of optical fibers with respective other optical fibers by using a fusion-splicer that includes a base member with a groove portion having a plurality of V-grooves formed therein for setting a plurality of optical fibers, and a pair of guide walls configured to guide setting of the plurality of optical fibers into the plurality of V-grooves, the optical fiber splicing method comprising:

- placing the plurality of optical fibers in the plurality of V-grooves while bringing one of the plurality of optical fibers into contact with a guide surface of one of the guide walls constituting the pair, the guide walls being disposed at an interval in a width direction of the groove portion; and
- fusion-splicing the plurality of optical fibers with respective other optical fibers,
- wherein thicknesses of the guide walls along a longitudinal direction of the plurality of optical fibers are each less than or equal to half of an overall length of the plurality of V-grooves, and
- a height of the guide walls is greater than a depth of the plurality of V-grooves.

7. The fusion splicer as claimed in claim 1, wherein the pair of guide walls is disposed:

- at a position corresponding to a center of the base member in the longitudinal direction;
- at a position corresponding to one end or another end of the base member in the longitudinal direction;
- at a position corresponding to the one end of the base member in the longitudinal direction, and another pair of said guide walls is disposed at a position corresponding to the another end of the base member in the longitudinal direction;
- at a first position corresponding to the center of the base member in the longitudinal direction and at a second position corresponding to the one end or the another end thereof in the longitudinal direction, with one guide wall positioned at each of the first and second positions;
- to project outward from the one end of the base member in the longitudinal direction;
- to project outward from the another end of the base member in the longitudinal direction;
- on an outer side of, and apart from, the one end of the base member in the longitudinal direction;
- on an outer side of, and apart from, the another end of the base member in the longitudinal direction; or
- such that at least one of the guide walls is configured to be movable in the width direction relative to the groove portion.

8. The optical fiber splicing method as claimed in claim 6, wherein the pair of guide walls is disposed:

- at a position corresponding to a center of the base member in the longitudinal direction;
- at a position corresponding to one end or another end of the base member in the longitudinal direction;
- at a position corresponding to the one end of the base member in the longitudinal direction, and another pair of said guide walls is disposed at a position corresponding to the another end of the base member in the longitudinal direction;
- at a first position corresponding to the center of the base member in the longitudinal direction and at a second position corresponding to the one end or the another end thereof in the longitudinal direction, with one guide wall positioned at each of the first and second positions;
- to project outward from the one end of the base member in the longitudinal direction;
- to project outward from the another end of the base member in the longitudinal direction;

on an outer side of, and apart from, the one end of the base member in the longitudinal direction;

on an outer side of, and apart from, the another end of the base member in the longitudinal direction; or such that at least one of the guide walls is configured to be movable in the width direction relative to the groove portion.

* * * * *